United States Patent
Kato

(10) Patent No.: US 10,761,788 B2
(45) Date of Patent: Sep. 1, 2020

(54) INFORMATION PROCESSING APPARATUS, SYSTEM, AND CONTROL METHOD

(71) Applicant: Kei Kato, Kanagawa (JP)

(72) Inventor: Kei Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/351,570

(22) Filed: Mar. 13, 2019

(65) Prior Publication Data

US 2019/0303063 A1     Oct. 3, 2019

(30) Foreign Application Priority Data

Mar. 29, 2018   (JP) .................................. 2018-063986

(51) Int. Cl.
*G06F 3/12*     (2006.01)

(52) U.S. Cl.
CPC .......... *G06F 3/1222* (2013.01); *G06F 3/1273* (2013.01); *G06F 3/1286* (2013.01)

(58) Field of Classification Search
CPC ..... G06F 3/1222; G06F 3/1273; G06F 3/1286
USPC ....................................................... 358/1.15
See application file for complete search history.

(56) References Cited

U.S. PATENT DOCUMENTS

| | | | | |
|---|---|---|---|---|
| 2002/0161740 A1* | 10/2002 | Nakamura | ............ | G06F 3/1204 |
| 2006/0077458 A1* | 4/2006 | Miyazaki | ............ | H04N 1/00461 358/1.15 |
| 2011/0267634 A1* | 11/2011 | Fukuoka | ............ | H04N 1/00432 358/1.13 |
| 2012/0117570 A1* | 5/2012 | Ozaki | ............ | G06Q 10/06 718/102 |
| 2014/0218762 A1* | 8/2014 | Abe | ............ | G06K 15/1803 358/1.15 |
| 2016/0088184 A1* | 3/2016 | Nakagawa | ............ | H04N 1/32765 358/1.15 |
| 2018/0015755 A1* | 1/2018 | Yamada | ............ | B41J 29/393 |
| 2019/0079716 A1* | 3/2019 | Tokuchi | ............ | G06F 16/219 |

FOREIGN PATENT DOCUMENTS

JP          2017-200178          11/2017

OTHER PUBLICATIONS

U.S. Appl. No. 16/085,058, filed Apr. 19, 2017, Yoshitaka Komine.

* cited by examiner

*Primary Examiner* — Allen H Nguyen
(74) *Attorney, Agent, or Firm* — Oblon, McClelland, Maier & Neustadt, L.L.P.

(57) ABSTRACT

An information processing apparatus, system, and control method are provided. The information processing apparatus connected to a plurality of networks having different segments receives an execution request of an application installed in the information processing apparatus from a communication apparatus connected to a specific network among the plurality of networks, determines whether the application corresponding to the execution request received through the specific network satisfies a predetermined condition, and updates history information indicating an execution history of the application associated with the specific network when it is determined that the predetermined condition is satisfied.

11 Claims, 17 Drawing Sheets

FIG. 5

| DEVICE | NETWORK ADDRESS/ NETMASK | DEFAULT GATEWAY |
|---|---|---|
| CLIENT TERMINAL 50a | 192.168.1.100/24 | 192.168.1.1/24 |
| ROUTER 30a | 192.168.1.1/24<br>192.168.10.1/24 | – |
| CLIENT TERMINAL 50aa | 192.168.10.100/24 | 192.168.10.1/24 |
| SERVER 90a | 192.168.10.11/24 | 192.168.10.1/24 |
| CLIENT TERMINAL 50b | 172.16.1.100/24 | 172.16.1.1/24 |
| ROUTER 30b | 172.16.1.1/24<br>172.16.10.1/24 | – |
| CLIENT TERMINAL 50bb | 172.16.10.100/24 | 172.16.10.1/24 |
| SERVER 90b | 172.16.10.11/24 | 172.16.10.1/24 |
| CLIENT TERMINAL 50c | 10.0.1.100/24 | 10.0.1.1/24 |
| ROUTER 30c | 10.0.1.1/24<br>10.0.10.1/24 | – |
| CLIENT TERMINAL 50cc | 10.0.10.100/24 | 10.0.10.1/24 |
| SERVER 90c | 10.0.10.11/24 | 10.0.10.1/24 |

| NETWORK | NETWORK ADDRESS/ NETMASK | DISPLAY NAME | HISTORY INFORMATION | | | EXECUTION HISTORY MONITORING SETTING |
|---|---|---|---|---|---|---|
| | | | COPY | SCAN | ... | |
| Net_A0 | 192.168.1.0/24 | NETWORK A0 | 10 | 5 | ... | ALL |
| Net_A1 | 192.168.10.0/24 | NETWORK A1 | 20 | N/A | ... | COPY |
| Net_B0 | 172.16.1.0/24 | NETWORK B0 | 0 | 0 | ... | ALL |
| Net_B1 | 172.16.10.0/24 | NETWORK B1 | 200 | 3 | ... | ALL |
| Net_C0 | 10.0.1.0/24 | NETWORK C0 | N/A | N/A | ... | NONE |
| Net_C1 | 10.0.10.0/24 | NETWORK C1 | N/A | N/A | ... | NONE |

FIG. 8

| SRC [IP] | [192.168.1.100/24] |
|---|---|
| DST [IP]: [APPLICATION] | [192.168.1.10/24]:[appA] |

| NETWORK | | NETWORK ADDRESS/ NETMASK | DISPLAY NAME | HISTORY INFORMATION 453 | | | EXECUTION HISTORY MONITORING SETTING 455 |
|---|---|---|---|---|---|---|---|
| NETWORK | DEVICE | | | COPY | SCAN | ... | |
| Net_A0 | — | 192.168.1.0/24 | NETWORK A0 | 10 | 5 | ... | ALL |
| Net_A1 | CLIENT TERMINAL 50aa | 192.168.10.100/24 | NETWORK A1 | 13 | N/A | ... | COPY |
| | CLIENT TERMINAL 50aaa | 192.168.10.101/24 | | 8 | N/A | ... | |
| Net_B0 | — | 172.16.1.0/24 | NETWORK B0 | 0 | 0 | ... | ALL |
| Net_B1 | CLIENT TERMINAL 50bb | 172.16.10.100/24 | NETWORK B1 | 30 | 0 | ... | ALL |
| | CLIENT TERMINAL 50bbb | 172.16.10.101/24 | | 170 | 3 | ... | |
| Net_C0 | — | 10.0.1.0/24 | NETWORK C0 | N/A | N/A | ... | NONE |
| Net_C1 | — | 10.0.10.0/24 | NETWORK C1 | N/A | N/A | ... | NONE |

FIG. 14

| NETWORK | NETWORK ADDRESS/NETMASK | DISPLAY NAME | HISTORY INFORMATION | | | EXECUTION HISTORY MONITORING SETTING | AUTHENTICATION INFORMATION | |
|---|---|---|---|---|---|---|---|---|
| | | | COPY | SCAN | ... | | ADMINIS-TRATOR ID | PASS-WORD |
| Net_A0 | 192.168.1.0/24 | NETWORK A0 | 10 | 5 | ... | ALL | userA0 | 1234 |
| Net_A1 | 192.168.10.0/24 | NETWORK A1 | 20 | N/A | ... | COPY | userA1 | 5328 |
| Net_B0 | 172.16.1.0/24 | NETWORK B0 | 0 | 0 | ... | ALL | userB0 | 0935 |
| Net_B1 | 172.16.10.0/24 | NETWORK B1 | 200 | 3 | ... | ALL | userB1 | 3407 |
| Net_C0 | 10.0.1.0/24 | NETWORK C0 | N/A | N/A | ... | NONE | userC0 | 7803 |
| Net_C1 | 10.0.10.0/24 | NETWORK C1 | N/A | N/A | ... | NONE | userC1 | 2307 |

450C, 453, 455, 459

INFORMATION PROCESSING APPARATUS, SYSTEM, AND CONTROL METHOD

CROSS-REFERENCE TO RELATED APPLICATION

This patent application is based on and claims priority pursuant to 35 U.S.C. § 119(a) to Japanese Patent Application No. 2018-063986, filed on Mar. 29, 2018 in the Japan Patent Office, the entire disclosure of which is hereby incorporated by reference herein.

BACKGROUND

Technical Field

The present disclosure relates to an information processing apparatus, system, and a control method.

Background Art

In a network system within an organization such as a company, there may be a plurality of different networks within the same organization. In such a case, communication between devices belonging to different networks is performed through, for example, a network device such as a router.

On the other hand, there are cases in which it is desired to restrict communication between devices belonging to different networks even within the same organization. For example, there may be one network that handles confidential information, such as personal information, and another, separate network that controls office equipment, and which does not handle such confidential information.

SUMMARY

Embodiments of the present disclosure described herein provide an improved information processing apparatus, system, and control method. The information processing apparatus, which is connected to a plurality of networks having different segments, receives an execution request of an application installed in the information processing apparatus from a communication apparatus connected to a specific network among the plurality of networks, determines whether the application corresponding to the execution request received through the specific network satisfies a predetermined condition, and updates history information indicating an execution history of the application associated with the specific network when it is determined that the predetermined condition is satisfied.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 5 is a diagram illustrating an example of a network management table according to the first embodiment of the present disclosure;

FIG. 8 is a diagram illustrating an example of an application execution request according to the first embodiment of the present disclosure;

FIG. 11 is a diagram illustrating an example of an application execution history management table according to a variation of the first embodiment of the present disclosure;

FIG. 14 is a diagram illustrating an example of an application execution history management table according to the second embodiment of the present disclosure;

Figure 1:
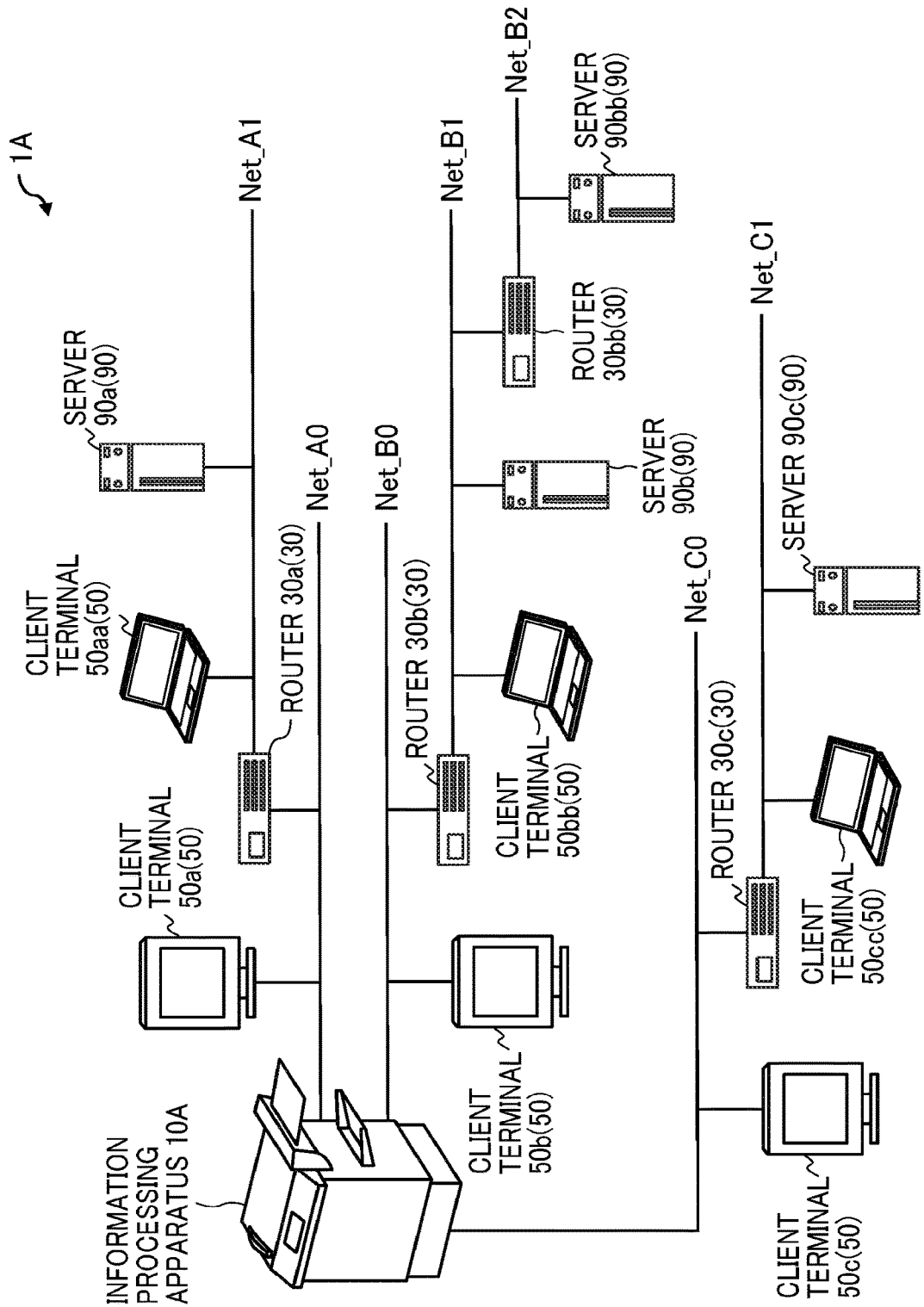
FIG. 1 is a diagram illustrating an example of a system configuration of an information processing system according to a first embodiment of a present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Embodiments of the present disclosure are described with reference to the drawings. In the description of the drawings, the same elements are denoted by the same reference numerals, and redundant description is omitted.

First Embodiment

System Configuration

FIG. 1 is a diagram illustrating an example of a system configuration of an information processing system according to a first embodiment. The information processing system 1A is a system capable of managing the application execution history for each network in a plurality of networks to which the information processing apparatus 10A is connected.

The information processing system 1A includes an information processing apparatus 10A, a router 30 (30a, 30b, 30c, hereinafter referred to as a router 30 when it is unnecessary to distinguish), a client terminal 50 (50a, 50 aa, 50b, 50bb, 50c, 50cc, hereinafter referred to as a client terminal 50 when it is unnecessary to distinguish) and a server 90 (90a, 90b, 90bb, 90c, hereinafter referred to as a server 90 when it is unnecessary to distinguish).

The information processing apparatus 10A is connected to a plurality of networks (Net_A0, Net_B0, Net_C0). The network Net_A0 is connected to the network Net_A1 through the router 30a. The network Net_B0 is connected to the network Net_B1 through the router 30b. The network Net_B1 is connected to the network Net_B2 through the router 30bb. The network Net_C0 is connected to the network Net_C1 through the router 30c.

The network connected to the information processing apparatus 10A is divided into a network Net_A system in which a network Net_A0 and a network Net_A1 are grouped, a network Net_B system in which a network Net_B0, a network Net_B1, and a network Net_B2 are grouped, and a network Net_C system in which a network Net_C0 and a network Net_C1 are grouped. The networks of each system are separated so that internet protocol (IP) communication cannot be performed.

A network address of the network Net_A0 is, for example, "192.168.1.0/24". The network address of the network Net_A1 is "192.168.10.0/24". The network address of the network Net_B0 is "172.16.1.0/24". The network address of the network Net_B1 is "172.16.10.0/24". The network address of the network Net_B2 is "172.16.100.0/24". The network address of the network Net_C0 is "10.0.1.0/24". The network address of the network Net_C1 is "10.0.10.0/24".

In this manner, the network addresses of the respective networks are set so as not to overlap. Note that the network addresses setting can be different from the example, as long as the IP addresses of the client terminal 50 and the server 90 that communicate directly with the information processing apparatus 10A are different. The IP addresses of the client terminal 50 and the server 90, which communicate directly, can overlap when a static network address port translation (NAPT) setting is used.

The information processing system 1A also controls routes to networks other than directly connected networks, provided that the router 30 is placed in a plurality of networks having different segments separated so as not to be able to communicate with each other. Thereby, in the information processing system 1A, it becomes possible to communicate through a router among a plurality of networks, enabling the information processing apparatus 10A to be used in a large-scale network. In the information processing system 1A according to the present embodiment, the description is given on the assumption that the networks of the respective systems are separated so that communication using IP cannot be performed, but communication between networks of each system may be possible depending on security requirements or the like. The information processing apparatus 10A may be connected to a network having a segment for establishing a connection with the internet.

The client terminal 50a, the client terminal 50b, and the client terminal 50c are connected to the network Net_A0, the network Net_B0, and the network Net_C0, respectively. The client terminal 50a and the server 90a are connected to the network Net_A1. The client terminal 50b and the server 90b are connected to the network Net_B1. The client terminal 50c and the server 90c are connected to the network Net_C1. The client terminal 50 and the server 90 can communicate with the information processing apparatus 10A through the respective connected networks.

The information processing apparatus 10A is an image forming apparatus such as a multifunction peripheral (MFP) that implements a plurality of functions such as a print function, a copy function, a scan function, and a facsimile function in one housing. The image forming apparatus may be referred to as an MFP, a copier, and the like. The information processing apparatus 10A may have only one of the print function, the copy function, the scan function, or the facsimile function. In this case, the information processing apparatus 10A is referred to as a printer, a copier, a scanner, or a facsimile. Further, in the information processing apparatus 10A, one or more applications for executing each function are installed.

Note that the information processing apparatus 10A is not limited to the image forming apparatus, and may be, for example, a projector (PJ), an interactive white board (IWB: a white board having an electronic whiteboard function capable of mutual communication), a head up display (HUD) device, an acoustic output device such as a speaker, an industrial machine, an imaging device, a sound collecting device, a medical device, a network household appliance, or the like.

The client terminal 50 is a communication apparatus connected to each network. The client terminal 50 is a communication apparatus which can be carried or operated by a user such as a notebook personal computer (PC) or the like. The client terminal 50 may be a mobile phone, a smartphone, a tablet terminal, a game machine, a personal digital assistant (PDA), a digital camera, a wearable PC, a desktop PC, or the like. The client terminal 50 is an example of the communication apparatus.

The server 90 is a server such as a job server and an authentication server respectively connected to each network. The server 90 accumulates a job for the information processing apparatus 10A requested by the client terminal 50, for example. Then, the server 90 outputs the job accumulated in the information processing apparatus 10A.

In the information processing system 1A, the client terminal 50 performs, for example, a printing request and transmission of device information using simple network management protocol (SNMP) to the information processing apparatus 10A. The information processing apparatus 10A transfers file information formed by the scanning process and the like to the server 90. Note that the print request, the transmission of the device information by the SNMP, the transfer of the scanned file information, and the like described in this example are merely examples, and other communication may be made. Further, although the example in which the information processing apparatus 10A is connected to three networks has been described, the information processing apparatus 10A may be connected to two networks or four or more networks.

Hardware Configuration

Figure 2:
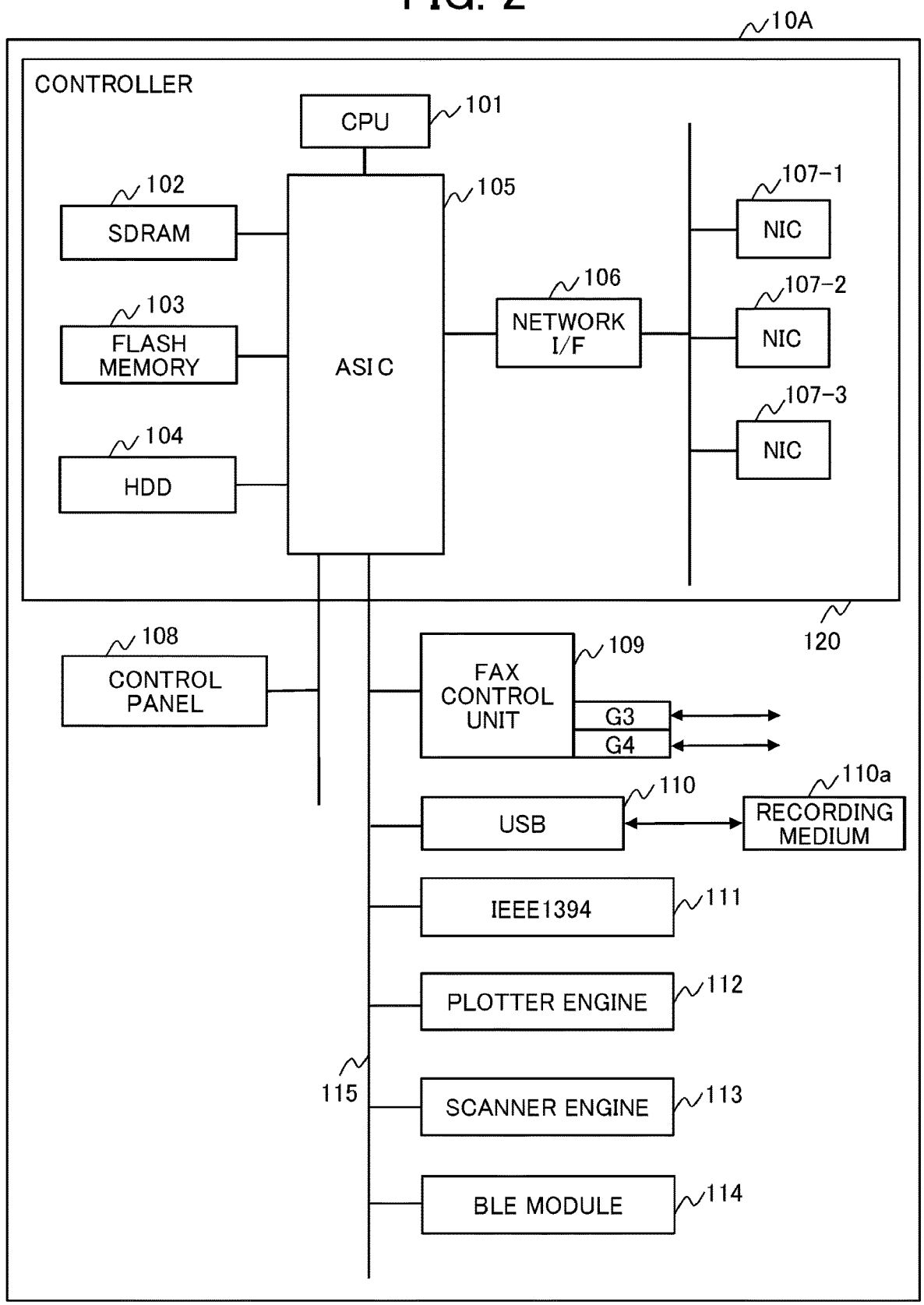
FIG. 2 is a diagram illustrating an example of a hardware configuration of an information processing apparatus according to embodiments of the present disclosure.

FIG. 2 is a diagram illustrating an example of a hardware configuration of the information processing apparatus according to the first embodiment of the present disclosure. Note that the hardware configuration illustrated in FIG. 2 may have the same configuration in each embodiment, or the configuration elements may be added or deleted as necessary. The information processing apparatus 10A includes a controller 120. The controller 120 includes a central processing unit (CPU) 101, a synchronous dynamic random access memory (SDRAM) 102, a flash memory 103, a hard disk drive (HDD) 104, an application specific integrated circuit (ASIC) 105, a network interface (I/F) 106, a network interface card (NIC) 107 and the like.

The ASIC 105 is a multifunction device board including a CPU interface, an SDRAM interface, a local bus interface, a peripheral component interface (PCI), bus interface, a media access controller (MAC), an HDD interface and the like.

The CPU 101 reads and executes various programs including one or more programs according to the present disclosure from the HDD 104 through the ASIC 105. The information processing apparatus 10A implements a control method according to the present disclosure, for example, by the CPU 101 executing the program according to the present disclosure. The SDRAM 102 functions as a program memory that stores various programs, a work memory that is used when the CPU 101 executes various programs, and the like. Instead of the SDRAM 102, a dynamic random access memory (DRAM) or a static random access memory (SRAM) may be used.

The flash memory 103 is a nonvolatile memory and stores a boot loader (boot program) and an operating system (OS) for starting the information processing apparatus 10A. The flash memory 103 functions as an application memory for storing each program. The flash memory 103 functions as a service memory for storing software for each service (copy service, print service, facsimile service).

The flash memory 103 functions as a firmware memory for storing firmware, a data memory for storing a network address, model number, and the like. Instead of the flash memory 103, other nonvolatile memories such as a nonvolatile RAM in which a RAM and a backup circuit using a battery are integrated or an electrically erasable programmable read-only memory (EEPROM) or the like may be used.

The HDD 104 is a nonvolatile storage medium that stores data irrespective of whether the information processing apparatus 10A is powered on or off. The HDD 104 records programs and data other than the programs and data stored in the flash memory 103. The HDD 104 may be used as a firmware memory.

The network I/F 106 is an interface for communicating (connecting) with an external device through a network. The NIC 107 is a hardware such as a local area network (LAN) card to connect to a network such as a LAN. Network interface cards (NICs) 107-1, 107-2, 107-3, . . . 107-$n$ (hereinafter referred to as NIC 107 when it is not necessary to distinguish NICs 107-1, 107-2, 107-3, . . . 107-$n$) are connected to the network I/F 106. The information processing apparatus 10A communicates with an external apparatus through the NIC 107.

The control panel 108 is connected to the controller 120 using a universal serial bus (USB) cable or the like. The control panel 108 is an interface for a user who operates the information processing apparatus 10A. The control panel 108 includes various operation keys, a liquid crystal display (LCD) or a cathode ray tube (CRT) as a display device, and a touch panel. By operating the control panel 108, the information processing apparatus 10A can input data, execute a job, and display result.

In addition, the controller 120 is connected to a fax control unit 109, a USB 110 to which a recording medium 110a can be attached, an Institute of Electrical and Electronic Engineers (IEEE) 1394 111, a plotter engine 112, a scanner engine 113, Bluetooth (registered trademark) low energy (BLE) module 114, and the like through a PCI bus 115. As a result, the information processing apparatus 10A can provide service such as a copy service, a print service, a facsimile service, and the like. The plotter engine 112 may employ either an electrophotographic method or an inkjet method.

Note that the configuration illustrated in FIG. 2 is an example, and the hardware configuration of the information processing apparatus 10A is not limited to the configuration in FIG. 2. For example, the network I/F 106 may be connected to the PCI bus 115. Further, in addition to being connected to a network by a wired LAN (Ethernet (registered trademark)) or the like, the network I/F 106 may be connected by a wireless LAN such as Wi-Fi (registered trademark). The network I/F 106 may have a digital service unit (DSU) or a modem connected to the telephone line network. The network I/F 106 may have a communication apparatus to connect to the mobile phone network.

Figure 3:
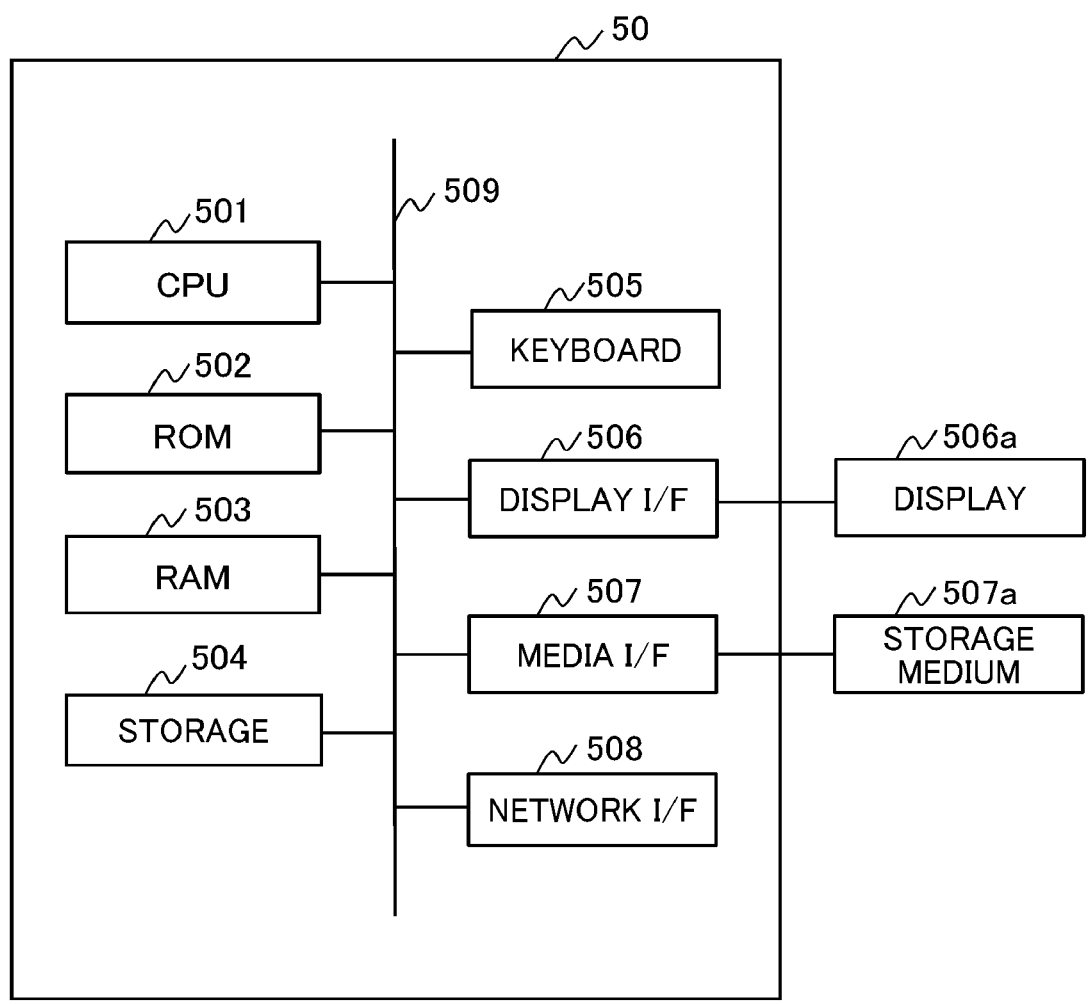
FIG. 3 is a diagram illustrating an example of a hardware configuration of a client terminal according to embodiments of the present disclosure.

FIG. 3 is a diagram illustrating an example of a hardware configuration of the client terminal according to the first embodiment of the present disclosure. Note that the hardware configuration illustrated in FIG. 3 may have the same configuration in each embodiment, or the configuration elements may be added or deleted as necessary. FIG. 3 illustrates the hardware configuration of the client terminal 50, in addition, the router 30 and the server 90 may have the same configuration. The client terminal 50 includes a CPU 501, a read only memory (ROM) 502, a RAM 503, a storage 504, a keyboard 505, a display I/F 506, a media I/F 507, a network I/F 508, a bus 509, and the like.

The CPU 501 controls the entire client terminal 50. The CPU 501 reads programs and data stored in, for example, the ROM 502 and the storage 504 to the RAM 503 and executes processing to implement one or more functions of the client terminal 50. The RAM 503 is a volatile memory used as a work area or the like of the CPU 501. The ROM 502 is a nonvolatile memory capable of holding programs and data even when the power is turned off.

The storage 504 is a storage device such as an HDD, a solid state drive (SSD), a flash ROM, or the like, and stores an OS, an application program, various data, and the like. The keyboard 505 is an interface for an operator to input various instructions to the client terminal 50, for example, a keyboard, a mouse, a touch panel, a voice input device, and the like.

The display I/F 506 displays various information possessed by the client terminal 50 on the display 506a in a form of a cursor, a menu, a window, a character, an image, or the like according to a request from the CPU 501. The media I/F 507 is an interface for connecting other devices to the client terminal 50. Other devices include, for example, a storage medium 507a such as a USB memory, a memory card, an optical disk, various electronic devices, and the like.

The network I/F 508 is a communication interface for communicating (connecting) with the information processing apparatus 10A through a network. The network I/F 508 includes an antenna, a radio section, a MAC section, and the like. The bus 509 is connected to each of the above components and transmits an address signal, a data signal, various control signals, and the like. The CPU 501, the ROM 502, the RAM 503, the storage 504, the keyboard 505, the display I/F 506, the media I/F 507, and the network I/F 508 are mutually connected through the bus 509.

Functional Configuration

Figure 4:
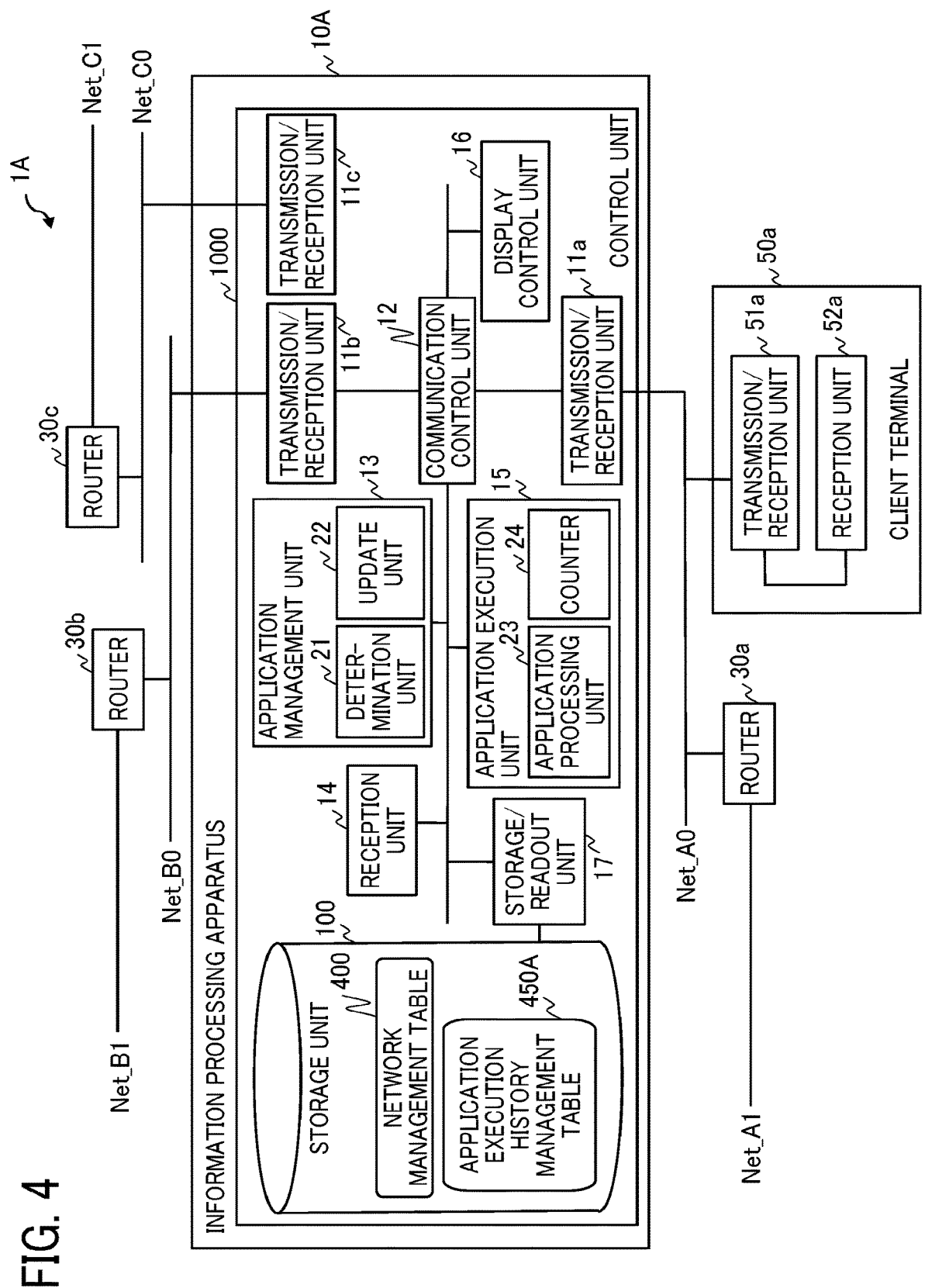
FIG. 4 is a diagram illustrating an example of a functional configuration of the information processing system according to the first embodiment of the present disclosure.

FIG. 4 is a diagram illustrating an example of a functional configuration of the information processing system according to the first embodiment of the present disclosure.

The information processing apparatus 10A illustrated in FIG. 4 includes a control unit 1000 that performs the function of the information processing apparatus 10A according to the present embodiment. The control unit 1000 is implemented by, for example, a program executed by the CPU 101 illustrated in FIG. 2. The control unit 1000 may be implemented by, for example, an extension board or the like incorporated in the information processing apparatus 10A. The control unit 1000 includes a transmission/reception unit 11a, a transmission/reception unit 11b, a transmission/reception unit 11c, a communication control unit 12, an application management unit 13, a reception unit 14, an application execution unit 15, a display control unit 16, a storage/readout unit 17, and a storage unit 100.

The transmission/reception unit 11a has a function of exchanging data (packet information) with the client terminal 50 or the server 90 through the network Net_A0. The transmission/reception unit 11a receives, for example, an application execution request from the client terminal 50a connected to the network Net_A0. The transmission/reception unit 11a may transmit or receive data (packet information) to or from the client terminal 50 or the server 90 connected to the network Net_A1 through the router 30a.

The transmission/reception unit 11b has a function of exchanging data (packet information) with the client terminal 50 or the server 90 through the network Net_B0. The transmission/reception unit 11c has a function of exchanging data (packet information) with the client terminal 50 or the server 90 through the network Net_C0. The information transmitted and received by the transmission/reception unit 11b and the transmission/reception unit 11c is the same as that of the transmission/reception unit 11a. The transmission/reception unit 11a, the transmission/reception unit 11b, and the transmission/reception unit 11c are implemented by, for example, a program executed by the NIC 107 and the CPU 101 illustrated in FIG. 2.

The communication control unit 12 has a function of controlling communication with the client terminal 50 or the server 90. The communication control unit 12 controls a communication path for transmitting or receiving data (packet) to or from the client terminal 50 or the server 90. Specifically, the communication control unit 12 specifies which of the transmission/reception unit 11a, transmission/reception unit 11b, and the transmission/reception unit 11c the data (packet information) is received. Then, the communication control unit 12 transmits data (packet information) to the client terminal 50 or the server 90 by using the specified transmission/reception unit (the transmission/reception unit 11a, transmission/reception unit 11b, or transmission/reception unit 11c).

In addition, the communication control unit 12 controls a communication path with the client terminal 50 or the server 90 by using a network management table 400 described below. The communication control unit 12 is implemented by, for example, a program executed by the CPU 101 illustrated in FIG. 2.

The application management unit 13 has a function of managing the application installed by the information processing apparatus 10A. The application managed by the application management unit 13 is a basic application executed to implement the function of the information processing apparatus 10A. For example, when the information processing apparatus 10A is an image processing apparatus such as an MFP, the application is a copy application, a scan application, or the like. The application may be an application installed as an extended function of the information processing apparatus 10A.

The application management unit 13 includes a determination unit 21 and an update unit 22. The determination unit 21 has a function of determining whether an application corresponding to an execution request satisfies a predetermined condition according to the network to which the client terminal 50 that transmitted the execution request is connected. In response to the application execution request from the client terminal 50, the determination unit 21 determines whether the requested application satisfies a predetermined condition in the network to which the client terminal 50 is connected, using the application execution history management table 450A described below. The predetermined condition is a condition indicating whether the execution history of the application is to be recorded (monitored, managed). That is, the determination unit 21 determines whether the application corresponding to the execution request is an application that requires recording (monitoring, managing) of the execution history. The determination unit 21 is implemented by, for example, a program executed by the CPU 101 illustrated in FIG. 2.

The update unit 22 has a function of updating the history information 453 indicating the execution history of the application included in the application execution history management table 450A described below. For example, when processing of an application installed in the information processing apparatus 10A is executed, the update unit 22 updates the history information 453 of the executed application. For example, in the case of the copy application, the history information 453 is the number of sheets copied, the number of copy jobs, or the like. Further, in the case of the scan application, for example, the history information 453 is the number of scan jobs, the number of sheets scanned, or the like. That is, the history information 453 is, for example, information on the usage amount of the application. The update unit 22 is implemented by, for example, a program executed by the CPU 101 illustrated in FIG. 2.

The reception unit 14 has a function of receiving information which user input to the control panel 108 illustrated in FIG. 2. The reception unit 14 receives information input to the control panel 108, for example, for updating the history information 453 included in the application execution history management table 450A described below. The reception unit 14 is implemented by, for example, a program executed by the control panel 108 and the CPU 101 illustrated in FIG. 2.

The application execution unit 15 has a function to execute an application installed in the information processing apparatus 10A. In response to a request from the client terminal 50, the application execution unit 15 executes an application installed in the information processing apparatus 10A.

The application execution unit 15 includes an application processing unit 23 and a counter 24. The application processing unit 23 has a function of executing processing of the requested application in response to a request from the client terminal 50 connected to the network. When the application is the copy application, the application processing unit 23 executes the copy application based on the print request from the client terminal 50 and executes the requested printing process. The application processing unit 23 is implemented by, for example, a program executed by the CPU 101 illustrated in FIG. 2.

The counter 24 has a function of counting the execution of the application executed by the application processing unit 23. When the printing process by the copy application is being executed, the counter 24 counts the number of sheets copied, the number of copy jobs, or the like. Meanwhile, when the scan process by the scan application is being executed, the counter 24 counts the number of scan jobs, the number of sheets scanned, or the like. The counter 24 is implemented by, for example, a program executed by the CPU 101 illustrated in FIG. 2.

The display control unit 16 has a function of causing a web browser to display an operation screen or the like for accepting an input operation by an administrator on the control panel 108 illustrated in FIG. 2. The display control unit 16 displays the operation screen on the control panel 108 by using a web page written by HyperText Markup Language (HTML), for example. The display control unit 16 is implemented by, for example, a program executed by the control panel 108 and the CPU 101 illustrated in FIG. 2.

The storage/readout unit 17 has a function of storing various data in the storage unit 100 or reading various data from the storage unit 100. The storage/readout unit 17 is implemented by, for example, a program executed by the CPU 101 illustrated in FIG. 2. In addition, the storage unit 100 stores the network management table 400 and the application execution history management table 450A.

Network Management Table

Hereinafter, a description is given of the network management table 400 with reference to FIG. 5. FIG. 5 is a diagram illustrating an example of the network management table according to the first embodiment of the present disclosure. In the network management table 400, the destination information of the client terminal 50, the router 30, and the server 90 that can communicate with the information processing apparatus 10A through each network is managed.

The network management table 400 includes information of "device" capable of communicating with the information processing device 10 A and information of "network address/netmask" and "default gateway" of "device". "Network address/netmask" and "default gateway" are examples of destination information of the client terminal 50, the router 30, and the server 90. The network management table 400 stores destination information of a device having a communication record with the information processing apparatus 10A. The information included in the network management table 400 may be set by the administrator as appropriate in addition to the information on the device having the communication record with the information processing apparatus 10A.

As illustrated in FIG. 5, each of the client terminal 50 and the server 90 is assigned with one IP address enabling communication through the network. A plurality of IP addresses is assigned to the router 30 so that communication can be performed through each of the connected networks. The server may be logically one device or may be redundantly configured by a plurality of devices.

In the case of the network management table 400 illustrated in FIG. 5, the IP address of the client terminal 50a is "192.168.1.100/24" and the default gateway is "192.168.1.1/24". The IP address of the router 30a is "192.168.1.1/24", and the netmask is "192.168.10.1/24". The IP address of the client terminal 50aa is "192.168.10.100/24" and the default gateway is "192.168.10.1/24". The IP address of the server 90a is "192.168.10.11/24", and the default gateway is "192.168.10.1/24".

The IP address of the client terminal 50b is "172.16.1.100/24", and the default gateway is "172.16.1.1/24". The IP address of the router 30b is "172.16.1.1/24", and the netmask is "172.16.10.1/24". The IP address of the client terminal 50bb is "172.16.10.100/24", and the default gateway is "172.16.10.1/24". The IP address of the server 90b is "172.16.10.11/24", and the default gateway is "172.16.10.1/24".

The IP address of the client terminal 50c is "10.0.1.100/24", and the default gateway is "10.0.1.1/24". The IP address of the router 30c is "10.0.1.1/24" and the netmask is "10.0.10.1/24". The IP address of the client terminal 50cc is "10.0.10.100/24", and the default gateway is "10.0.10.1/24". The IP address of the server 90c is "10.0.10.11/24", and the default gateway is "10.0.10.1/24".

The communication control unit 12 of the information processing apparatus 10A controls the communication path of the client terminal 50 or the server 90 based on the destination information of the client terminal 50 or the server 90 included in the network management table 400. Note that the information included in the network management table 400 is not limited to the device and the destination illustrated, for example, in FIG. 5.

Application Execution History Management Table

Hereinafter, a description is given of the application execution history management table 450A with reference to FIG. 6.

Figure 6:
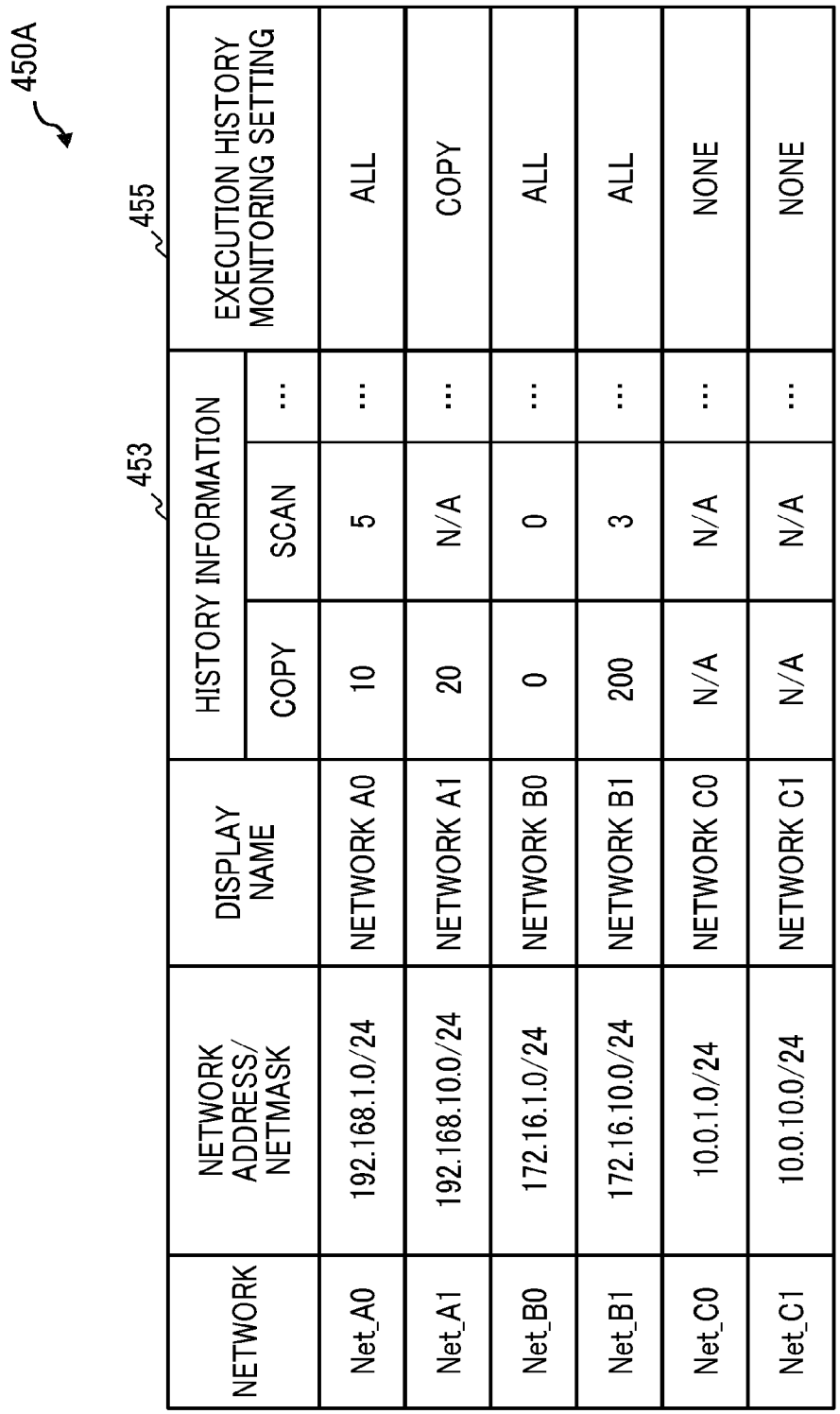
FIG. 6 is a diagram illustrating an example of an application execution history management table according to the first embodiment of the present disclosure.

FIG. 6 is a diagram illustrating an example of an application execution history management table according to the first embodiment of the present disclosure. The application execution history management table 450A manages the execution history of the application installed in the information processing apparatus 10A for each of the networks to which the information processing apparatus 10A is connected.

In the application execution history management table 450 A, information for identifying "network" to which the information processing apparatus 10A is connected is associated with network address/netmask, display name, history information 453, and execution history monitoring setting 455. "Network" indicates each of the networks connected to the information processing apparatus 10A. The "network"

may be set by the administrator of the network or may be automatically set by being connected to each network.

The "display name" is the name of the network. The "display name" may be set by the administrator of the network or may be set automatically when connected to each network.

The history information 453 indicates the execution history of each application for each network. The history information 453 indicates the number of times each application has been executed (usage amount) as a cumulative value for each network. For example, in the case of the copy application, the history information 453 is the number of sheets copied, the number of copy jobs, or the like. Further, in the case of the scan application, for example, the history information 453 is the number of scan jobs, the number of sheets scanned, or the like. Every time an application requested through the network is executed, the update unit 22 updates the value of the history information 453 associated with the corresponding network.

The execution history monitoring setting 455 is a setting value indicating whether or not to record the application execution history for each network. That is, the execution history monitoring setting 455 sets whether or not each application is managed (monitored) for each network. The execution history monitoring setting 455 is an example of setting information. For the application that requires recording of the execution history, the execution history of the application is counted by the counter 24. On the other hand, for the application that does not require recording of the execution history, the execution history is not counted by the counter 24.

By using the application execution history management table 450A, the information processing apparatus 10A can manage the execution history of the application for each network, so that the information processing apparatus 10A can cooperate with an external system such as a charging service using the history information 453 for each network. The information processing system 1A can implement a specific network to be freely used by providing a network that records (manages) the execution history of the application and a network that does not record (manage) the execution history.

In the case of the application execution history management table 450A illustrated in FIG. 6, the information processing apparatus 10A counts the application execution for the networks Net_A0, Net_B0, and Net_B1 whose execution history monitoring setting 455 is "all". The information processing apparatus 10A records the execution history of only the "copy application" among the applications for the network Net_A0 whose execution history monitoring setting 455 is "copy". The information processing apparatus 10A does not count the execution of the application with respect to the networks Net_C0 and Net_C1 in which the execution history monitoring setting 455 is "none".

Note that the execution history of the application may not be stored for each application but for each detailed setting in the application. For example, in the case of a copy application, the application execution history may be stored for each color setting (monochrome or color) or paper size.

Operation of First Embodiment

Hereinafter, an application execution process in the information processing system according to the first embodiment is described.

Figure 7:
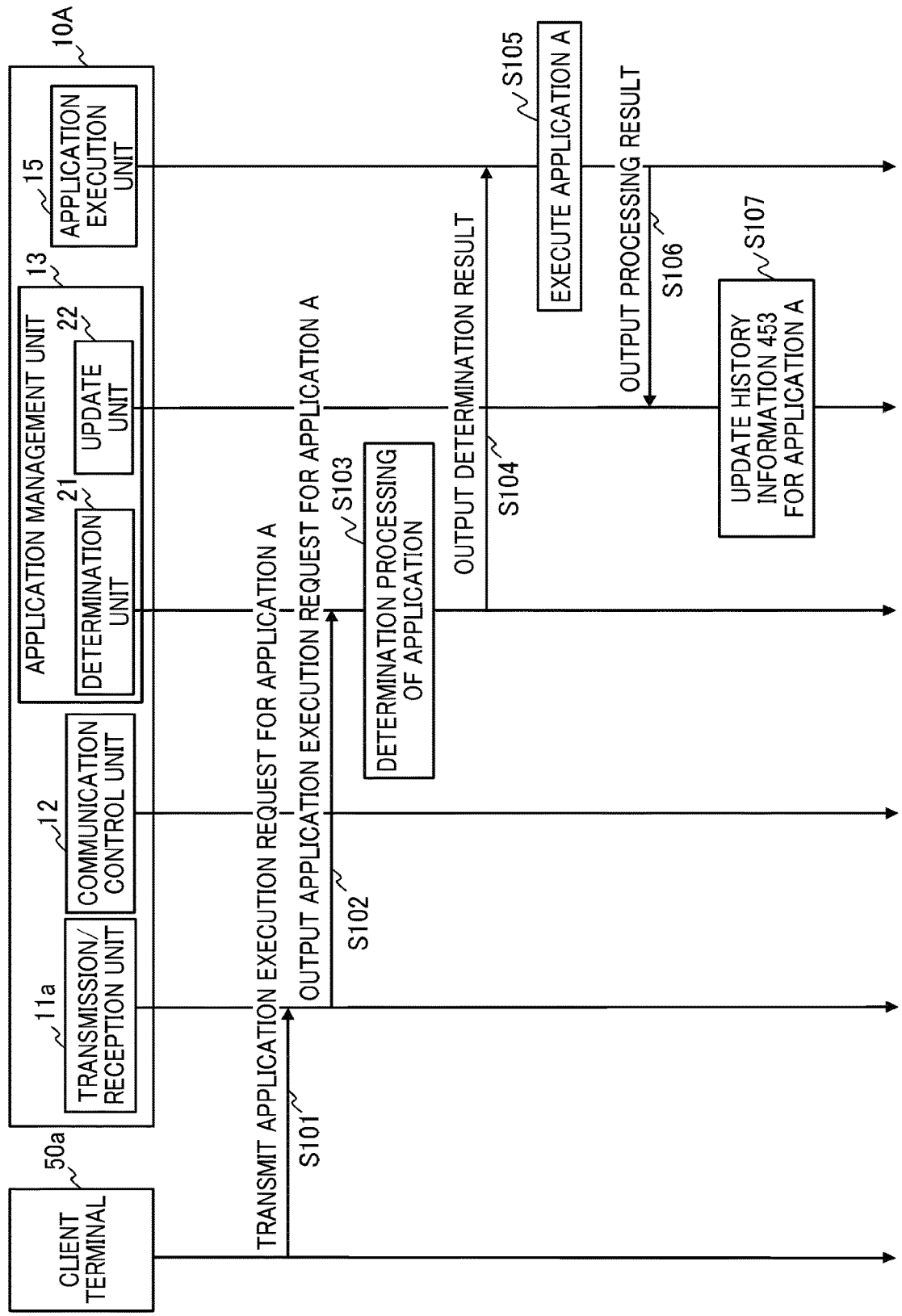
FIG. 7 is a sequence diagram illustrating an example of execution processing of an application in the information processing system according to the first embodiment of the present disclosure.

FIG. 7 is a sequence diagram illustrating an example of execution processing of an application in the information processing system according to the first embodiment of the present disclosure. FIG. 7 illustrates a case in which an execution request of the application A (app A) is transmitted from the client terminal 50a connected to the network Net_A0. Note that the application A (app A) is assumed to be a copy application.

Further, it is assumed that whether the application is an application that records an execution history (whether it is an application to be managed) is determined using the application execution history management table 450A illustrated in FIG. 6. Note that the client terminal 50 that transmits the execution request and the type of application related to the execution request are not limited to the examples below, and the same processing is performed for other client terminals 50 and applications.

In step S101, the client terminal 50a transmits an application execution request to the information processing apparatus 10A. Specifically, the client terminal 50a transmits an execution request of the application A (app A) requested by the user using the client terminal 50a to the information processing apparatus 10A.

FIG. 8 is a diagram illustrating an example of the execution request according to the first embodiment of the present disclosure. The execution request 40 includes at least the IP address of the transmission source (SRC: source) of the execution request, the IP address of the transmission destination (DST: destination) of the execution request, and information of the application to be executed. The execution request 40 illustrated in FIG. 8 includes the IP address (192.168.1.100/24) of the client terminal 50a as the transmission source. The execution request 40 illustrated in FIG. 8 includes the IP address (192.168.1.10/24) of the information processing apparatus 10A as the transmission destination. The execution request 40 illustrated in FIG. 8 includes the information of the application A (app A) as the application to be executed. Note that the information included in the execution request is not limited to the information illustrated, for example, in FIG. 8. The transmission/reception unit 11a of the information processing apparatus 10A receives an execution request of the application A (app A) transmitted from the client terminal 50a (an example of a reception step).

In step S102, the transmission/reception unit 11a of the information processing apparatus 10A outputs the execution request of the application to the determination unit 21 of the application management unit 13. In step S103, the determination unit 21 of the information processing apparatus 10A determines whether the requested application satisfies a predetermined condition (an example of a determination step).

Here, details of the process of the determination unit 21 of the information processing apparatus 10A is described.

Figure 9:
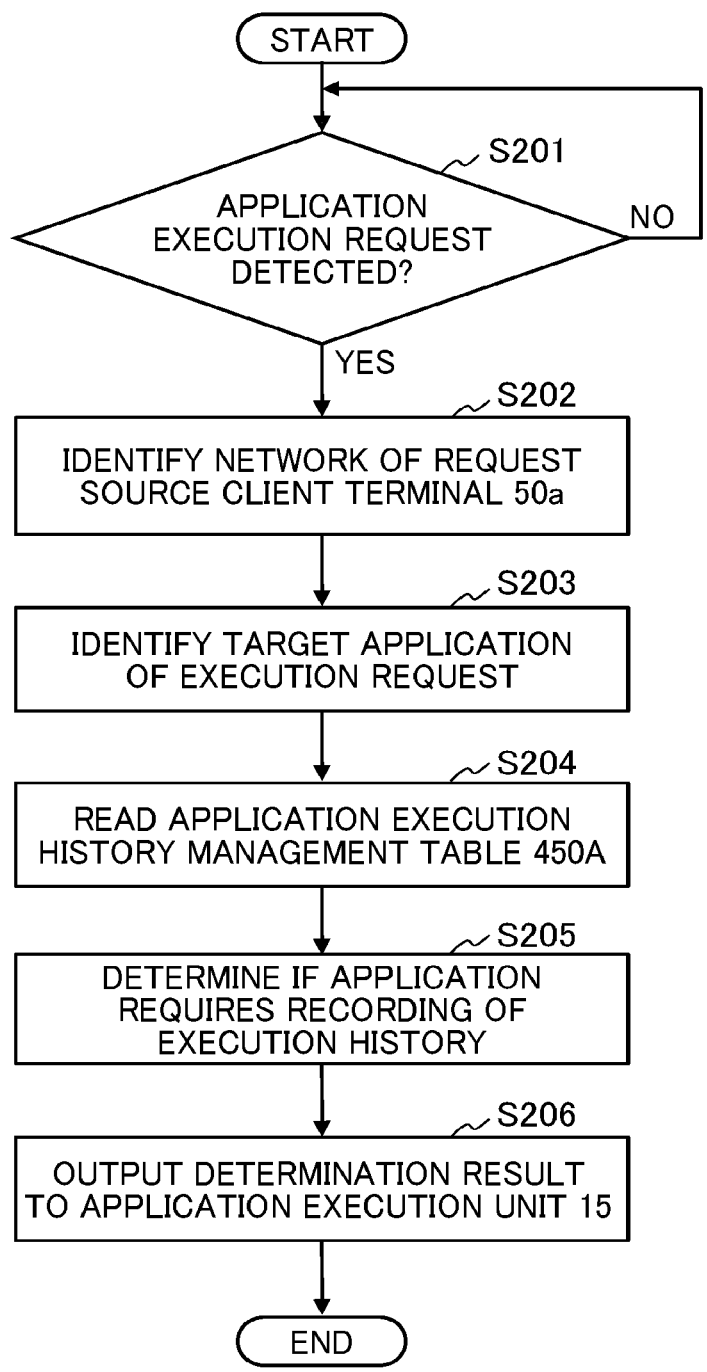
FIG. 9 is a flowchart illustrating an example of determination processing of an application to be monitored in the information processing apparatus according to the first embodiment of the present disclosure.

FIG. 9 is a flowchart illustrating an example of determination processing of an application to be monitored in the information processing apparatus according to the first embodiment of the present disclosure.

In step S201, when the determination unit 21 detects an application execution request, the determination unit 21 moves the process to step S202. On the other hand, when the determination unit 21 has not detected the application execution request, the determination unit 21 repeats the process of step S201.

In step S202, the determination unit 21 identifies the network to which the client terminal 50a, which is the transmission source of the execution request, is connected.

For example, when detecting the execution request 40 illustrated in FIG. 8, the determination unit 21 determines from the IP address "192.168.1.100/24" of the transmission source client terminal 50a that the client terminal 50a is connected to the network Net_A0.

In step S203, the determination unit 21 identifies the application that is the target of the execution request. For example, when detecting the execution request 40 illustrated in FIG. 8, the determination unit 21 identifies the application A (app A) included in the detected execution request. Note that the order of the processing of step S202 and the processing of step S203 may be reversed or these steps may be performed simultaneously.

In step S204, the determination unit 21 reads the application execution history management table 450A stored in the storage unit 100. Specifically, the determination unit 21 outputs a read request of the application execution history management table 450A to the storage/readout unit 17. In response to detecting the read request, the storage/readout unit 17 reads the application execution history management table 450A stored in the storage unit 100. Then, the storage/readout unit 17 outputs the application execution history management table 450A to the determination unit 21.

In step S205, the determination unit 21 determines whether the specified application satisfies a predetermined condition in the specified network. Specifically, using the application execution history management table 450A, the determination unit 21 determines whether the specified application among the applications associated with the identified network is an application that requires recording (managing) the execution history. In this case, since the execution history monitoring setting 455 associated with the identified network "Net_A0" is "all", the determination unit 21 determines that the specified application "app A" is the application that requires recording the execution history.

In step S206, the determination unit 21 outputs the determination result to the application execution unit 15. In addition to the information on whether the application is the application that require recording (managing) the execution history, the output determination result includes information for identifying the application and the like.

Returning to FIG. 7, the description of the application execution processing in the information processing system 1 is continued. In step S104, the determination unit 21 of the information processing apparatus 10A outputs the determination result to the application execution unit 15. In the case of the application execution history management table 450A illustrated in FIG. 6, since all the applications in the network Net_A0 to which the execution request has been transmitted are the applications to record (manage) the execution history, the determination unit 21 outputs to the application execution unit 15 the determination result of recording the execution history (management "yes").

In step S105, the application execution unit 15 of the information processing apparatus 10A executes the requested application A. In step S106, the application execution unit 15 of the information processing apparatus 10A transmits the processing result of the executed application to the update unit 22 of the application management unit 13. The processing result of the application includes information on the execution history of the executed application. In step S107, the update unit 22 of the information processing apparatus 10A updates the history information 453 indicating the execution history of the application A included in the application execution history management table 450A (an example of an update step).

Figure 10:
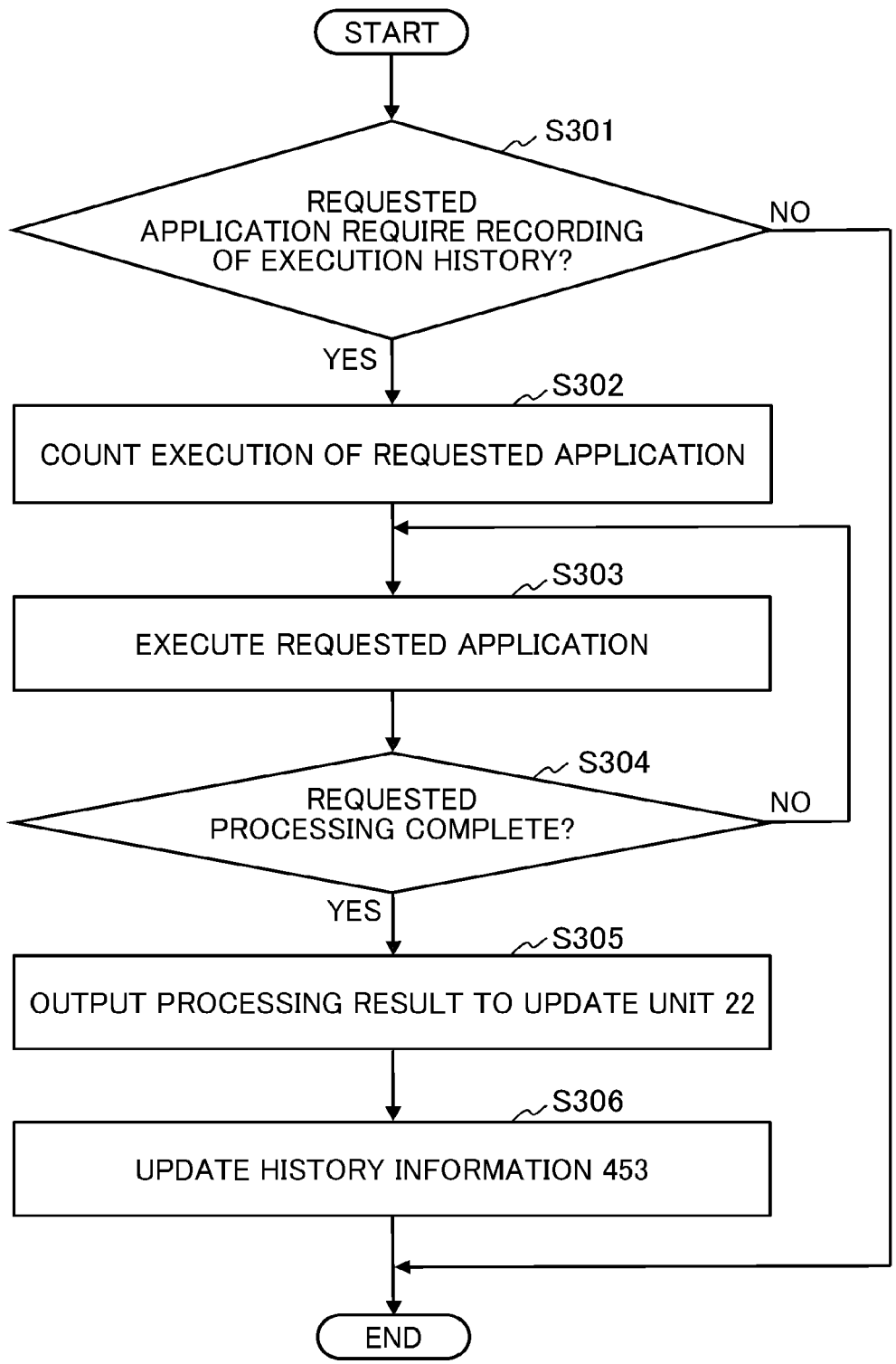
FIG. 10 is a flowchart illustrating an example of update processing of an application execution history in the information processing apparatus according to the first embodiment of the present disclosure.

Here, with reference to FIG. 10, details of the process from the reception of the execution request by the application to the update of the execution history of the application is described. FIG. 10 is a flowchart illustrating an example of update processing of an application execution history in the information processing apparatus according to the first embodiment of the present disclosure. Note that the determination in the determination unit 21 as to whether or not the application requires recording of the execution history is performed by the process illustrated in FIG. 9.

In step S301, when the requested application is an application that requires recording (managing) the execution history, the determination unit 21 of the information processing apparatus 10A causes the process to proceed to step S302. On the other hand, when the requested application is not an application that require recording (managing) the execution history, the determination unit 21 executes the application process requested by the application processing unit 23 of the application execution unit 15 and ends the process.

In step S302, the counter 24 of the application execution unit 15 starts counting the execution of the requested application. For example, in the case of the copy application, the application execution history is counted by the number of sheets copied or the number of copy jobs. The counter 24 continues to count the execution of the application to the processing by the application processing unit 23 is completed.

In step S303, the application processing unit 23 of the application execution unit 15 starts the processing of the requested application. In step S304, when the requested process is completed, the application processing unit 23 causes the process to proceed to step S305. On the other hand, the application processing unit 23 repeats the processing from step S303 to the requested processing is completed.

In step S305, the application execution unit 15 outputs the processing result of the application to the update unit 22. The processing result of the application includes information on the count result by the counter 24. The processing result of the application may include information indicating success or failure of the processing.

In step S306, the update unit 22 updates the history information 453 included in the application execution history management table 450A stored in the storage unit 100. For example, when detecting the count result of "three copies," the update unit 22 adds the count result to the history information 453 of the copy application associated with the network Net_A0 of the application execution history management table 450A. In this manner, the information processing apparatus 10A cumulatively manages the execution history of the application for each network that is the transmission source of the application execution request.

Effect of the First Embodiment

As described above, the information processing system 1A according to the first embodiment can manage the execution history of applications for each network in a plurality of networks connected to the information processing apparatus 10A. Further, even when each network belongs to a different organization, the information processing system 1A can manage the history information 453 for each network by using the application execution history management table 450A. Furthermore, the information processing system 1A can ascertain the execution history of the application for each network even when the additional system (for example, the billing system) introduced for each network is different, so the addition of a new network or introduction of an additional system can be made flexibly.

Variation of First Embodiment

Hereinafter, an information processing system according to a variation of the first embodiment is described. Note that the same configuration and the same function as those in the first embodiment are denoted by the same reference numbers, and description thereof is omitted. In the information processing system according to the variation of the first embodiment, the information processing apparatus 10A records the execution history of the application installed in the information processing apparatus 10A not only for each network to which the information processing apparatus 10A is connected but also for each client terminal 50 that can communicate with the information processing apparatus 10A.

FIG. 11 is a diagram illustrating an example of an application execution history management table according to a variation of the first embodiment of the present disclosure. In addition to the information included in the application execution history management table 450A illustrated in FIG. 6, the application execution history management table 450B has history information 453 associated with information for identifying each client terminal 50 connected to the network.

In the application execution history management table 450B illustrated in FIG. 11, for example, history information 453 is associated with each of the client terminal 50aa and the client terminal 50aaa connected to the same network Net_A1. Further, in the application execution history management table 450B illustrated in FIG. 11, for example, history information 453 is associated with each of the client terminal 50 bb and the client terminal 50 bbb connected to the same network Net_B1.

When receiving the application execution request from the client terminal 50, the determination unit 21 of the information processing apparatus 10A uses the application execution history management table 450B to determine whether or not the application corresponding to the execution request exists in the network to which the client terminal 50 is connected and determines whether the application requires the recording (managing) of the execution history. Then, when the application for recording the execution history is executed, the update unit 22 of the information processing apparatus 10A updates the history information 453 associated with the client terminal 50.

In this manner, the information processing apparatus 10A can manage the history information 453 indicating the execution history of the application for each of the plurality of client terminals 50 connected to the same network by using the application execution history management table 450B. Note that the execution history monitoring setting 455 of the application execution history management table 450B may be stored not only for each network to which the information processing apparatus 10A is connected but also for each client terminal 50 that can communicate with the information processing apparatus 10A.

Second Embodiment

Hereinafter, an information processing system according to a second embodiment is described. Note that the same configuration and the same function as those in the first embodiment are denoted by the same reference numbers, and description thereof is omitted. The information processing system 1B according to the second embodiment is configured for the administrator of the information processing system 1B to set or change the setting of each network using the administrator terminal 70.

System Configuration

Figure 12:
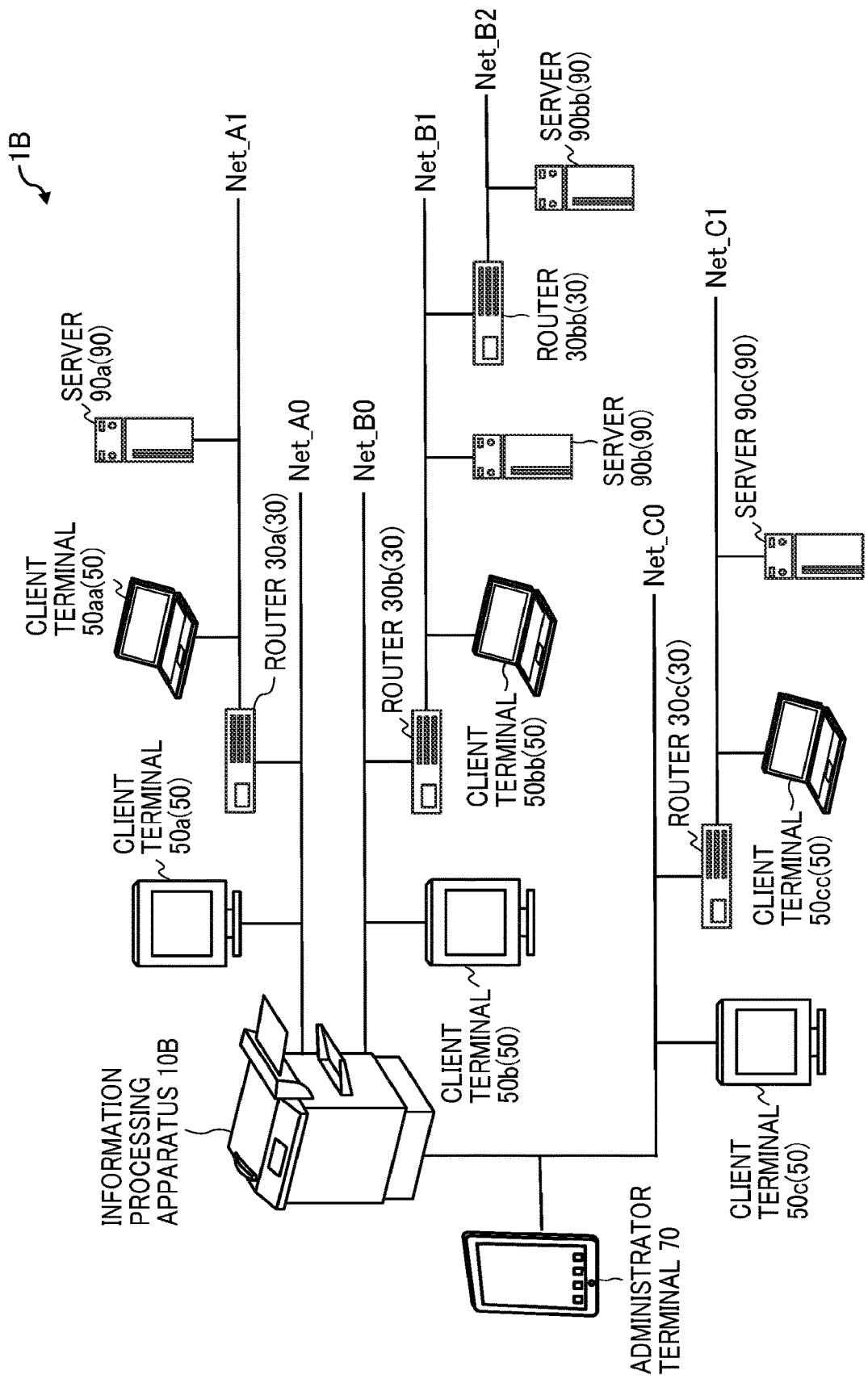
FIG. 12 is a diagram illustrating an example of a system configuration of an information processing system according to a second embodiment of the present disclosure.

FIG. 12 is a diagram illustrating an example of a system configuration of the information processing system according to the second embodiment of the present disclosure. In addition to the configuration of the information processing system 1A, the information processing system 1B includes an administrator terminal 70 connected to the network Net_C0.

The administrator terminal 70 is a terminal used by an administrator of the information processing system 1B. The administrator terminal 70, for example, manages the execution history of the application installed in the information processing apparatus 10B. The administrator who uses the administrator terminal 70, for example, manages the organization that the network included in the information processing system 1B belongs based on the execution history of the application. The administrator terminal 70 is, for example, a communication apparatus such as a tablet terminal. The administrator terminal 70 may be a mobile phone, a smartphone, a notebook PC, a wearable PC, a desktop PC, or the like.

FIG. 12 illustrates an example in which the administrator terminal 70 is connected to the network Net_C0, but the network to which the administrator terminal 70 is connected is not limited to the network Net_C0. The information processing system 1B may include a plurality of administrator terminals 70 connected to different networks.

Functional Configuration

Figure 13:
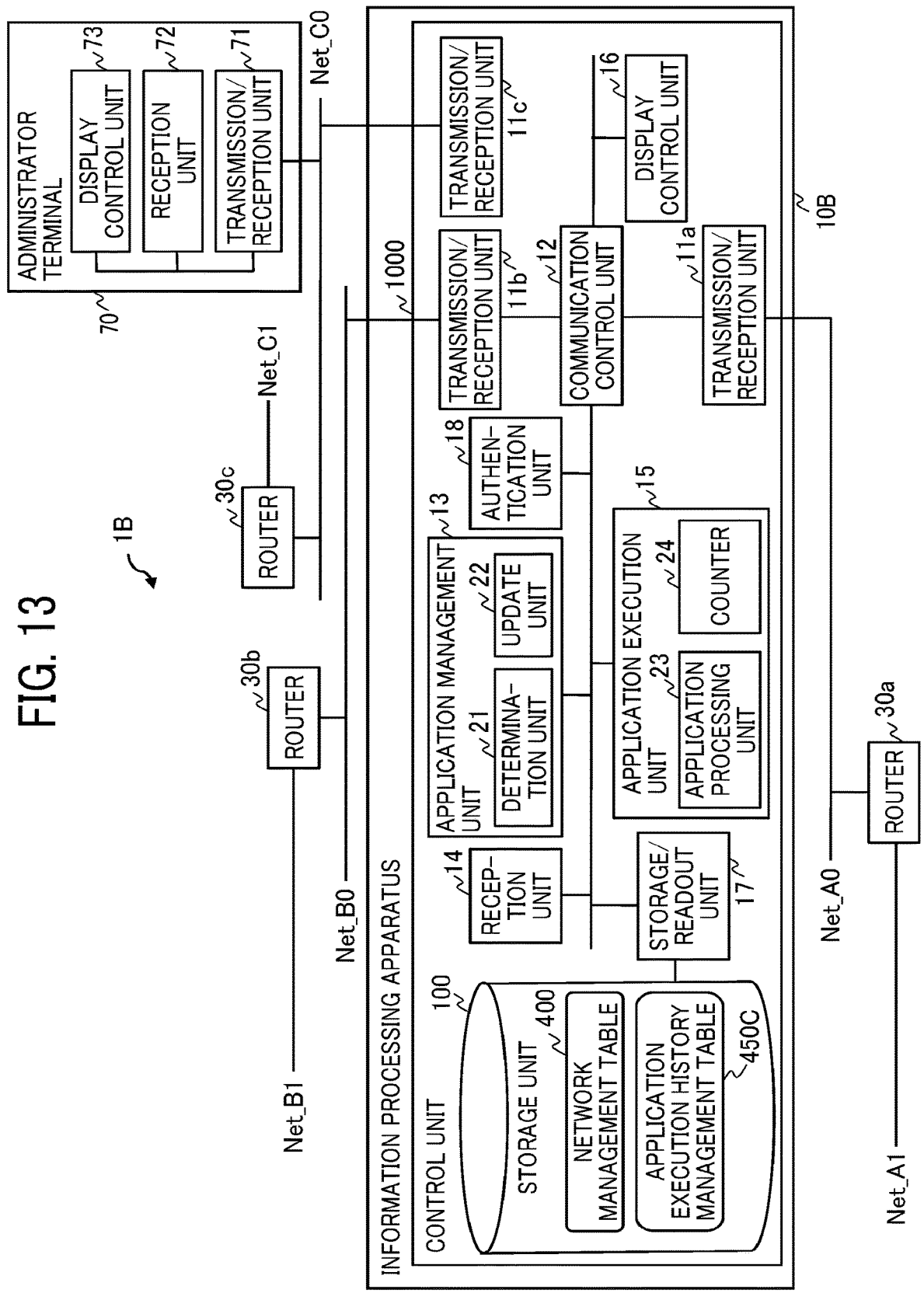
FIG. 13 is a diagram illustrating an example of a functional configuration of the information processing system according to the second embodiment of the present disclosure.

FIG. 13 is a diagram illustrating an example of a functional configuration of the information processing system according to the second embodiment of the present disclosure. The functions executed by the information processing apparatus 10B include the authentication unit 18 in addition to the configuration of the information processing apparatus 10A.

The authentication unit 18 has a function of authenticating the administrator or the administrator terminal 70 based on the administrator information transmitted from the administrator terminal 70. The authentication unit 18 is mainly implemented by a program or the like executed by the CPU 101 as illustrated in FIG. 2.

The transmission/reception unit 11c receives the authentication request of the administrator or the administrator terminal 70 through the network Net_C0. Then, the transmission/reception unit 11c transmits the history information 453 indicating the application execution history to the administrator terminal 70 used by the authenticated administrator or the authenticated administrator terminal 70 through the network Net_C0.

The functions implemented by the administrator terminal 70 include a transmission/reception unit 71, a reception unit 72, and a display control unit 73. The hardware configuration of the administrator terminal 70 is the same as the hardware configuration of the client terminal 50 as illustrated in FIG. 3, so the description thereof is omitted.

The transmission/reception unit 71 has a function of exchanging data (packet information) with the information processing apparatus 10B through a network. The transmission/reception unit 71 transmits an authentication request of the administrator or the administrator terminal 70 to the information processing apparatus 10B through, for example, the network Net_C0. The transmission/reception unit 71 is implemented by, for example, a program executed by the network I/F 508 and the CPU 501 as illustrated in FIG. 3.

The reception unit 72 has a function of accepting user input to input devices such as the keyboard 505 as illustrated in FIG. 3. The reception unit 72 receives, for example, administrator information for identifying the administrator of the information processing system 1B. The reception unit 72 is implemented by, for example, a program executed by the CPU 501 as illustrated in FIG. 3.

The display control unit 73 has a function of causing the web browser to display an operation screen or the like for accepting an input operation by the administrator on the display 506a as illustrated in FIG. 3. The display control unit 73 displays the operation screen on the display 506a by using a web page written by HTML, for example. The display control unit 73 displays history information 453 indicating the execution history of the application transmitted from the information processing apparatus 10B. The display control unit 73 is implemented by, for example, the display 506a and a program executed by the CPU 501 as illustrated in FIG. 3.

Application Execution History Management Table

FIG. 14 is a diagram illustrating an example of an application execution history management table according to the second embodiment of the present disclosure. In addition to the information included in the application execution history management table 450A illustrated in FIG. 6, the application execution history management table 450C is associated with authentication information 459 for each network.

The authentication information 459 is information used for authentication of the administrator terminal 70. The authentication information 459 includes an administrator ID and a password. The authentication information 459 is not limited to the administrator ID and the password. An administrator name, a terminal name, a terminal ID, or the like may be included in the authentication information 459.

The authentication unit 18 authenticates the administrator terminal 70 for each network based on the administrator information and the authentication information 459 transmitted from the administrator terminal 70. The information processing apparatus 10B transmits the history information 453 associated with the network for which the authentication of the administrator terminal 70 has been successful to the authenticated administrator terminal 70. As a result, the administrator terminal 70 can ascertain and manage the execution history of the application of the network having an administrative authority.

The information processing apparatus 10B may transmit the execution history monitoring setting 455 associated with the network for which the authentication of the administrator terminal 70 is successful to the authenticated administrator terminal 70. As a result, the administrator terminal 70 can set or change the execution history monitoring setting 455 of the network having the administrative authority.

Operation of Second Embodiment

Figure 15:
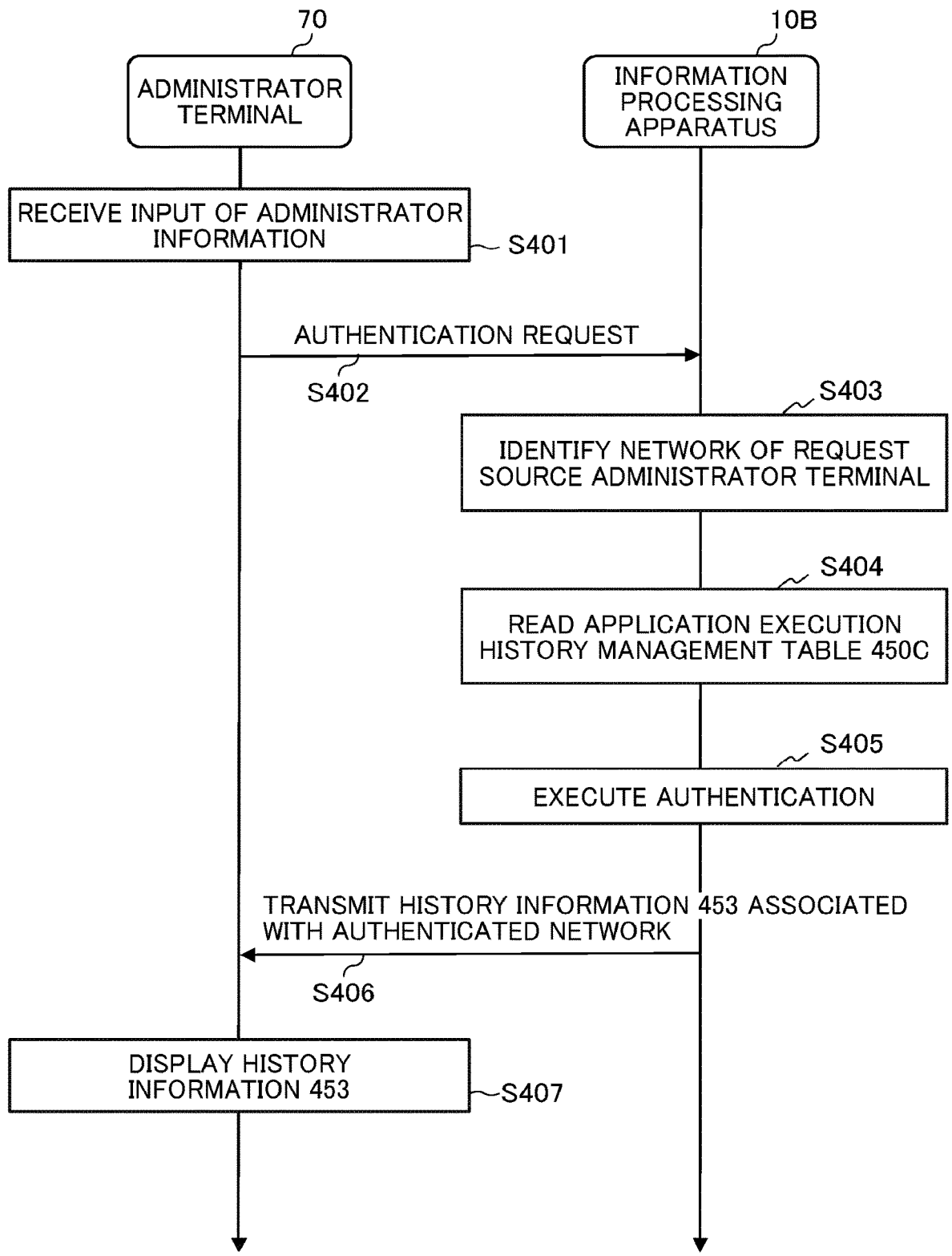
FIG. 15 is a sequence diagram illustrating an example of history information providing processing indicating an execution history of an application in the information processing system according to the second embodiment of the present disclosure.

FIG. 15 is a sequence diagram illustrating an example of history information providing process indicating an execution history of an application in the information processing system according to the second embodiment of the present disclosure. In FIG. 15, the administrator terminal 70 is assumed to be connected to the network Net_C0 as in FIG. 12.

In step S401, the reception unit 72 of the administrator terminal 70 receives the input of the administrator information by using the input device such as the keyboard 505 as illustrated in FIG. 3. The administrator information is identification information for identifying an administrator of the information processing system 1B, for example, an administrator ID or a password.

In step S402, the transmission/reception unit 71 of the administrator terminal 70 transmits an authentication request including the administrator information accepted by the reception unit 72 to the information processing apparatus 10B through the network Net_C0. The transmission/reception unit 11c of the information processing apparatus 10B receives the authentication request of the administrator terminal 70 through the network Net_C0.

In step S403, the communication control unit 12 of the information processing apparatus 10B identifies the network to which the administrator terminal 70 that is the transmission source of the authentication request is connected. In this case, since the authentication request is received by the transmission/reception unit 11c, the communication control unit 12 determines that the administrator terminal 70 is connected to the network Net_C system.

In step S404, the storage/readout unit 17 of the information processing apparatus 10B reads the application execution history management table 450C stored in the storage unit 100. Specifically, the storage/readout unit 17 outputs a read request of the application execution history management table 450C to the storage unit 100. In response to the read request, the storage unit 100 outputs the application execution history management table 450C to the storage/readout unit 17.

In step S405, the authentication unit 18 of the information processing apparatus 10B, using the administrator information included in the received authentication request and the authentication information 459 included in the application execution history management table 450C, the authentication of the administrator terminal 70 is executed.

In step S406, the transmission/reception unit 11c of the information processing apparatus 10B transmits history information 453 indicating the execution history of the application associated with the network authenticated by the authentication unit 18 to the administrator terminal 70. In this case, the information processing apparatus 10B specifies the administrator terminal 70 connected to the network Net_C system in the processing of the communication control unit 12 in step S403, so that the communication with the administrator terminal 70 is performed in the network Net_C system using the transmission/reception unit 11c. In addition, the transmission/reception unit 11c may transmit the execution history monitoring setting 455 on the authenticated network to the administrator terminal 70 together with the history information 453.

In step S407, the display control unit 73 of the administrator terminal 70 displays the history information 453 received by the transmission/reception unit 71 on the display 506a illustrated in FIG. 3. As a result, the administrator can ascertain the execution history of the application in the network to be managed.

Effect of Second Embodiment

As described above, in the information processing system 1B according to the second embodiment, even if the networks to which the information processing apparatus 10B is connected belong to different organizations, the administrator of each network can install appropriate settings for the network to be managed by using the administrator terminal 70. Further, since the information processing system 1B performs authentication using authentication information set for each network, browsing of the execution history of the application and setting or changing of the execution history monitoring setting 455 and the like by a third party or an administrator of a different network can be prevented.

Variation of Second Embodiment

Hereinafter, an information processing system according to a variation of the second embodiment is described. The information processing system according to the variation of the second embodiment has a configuration in which an administrator manages settings for each network, using the control panel 108 of the information processing apparatus 10B.

Figure 16:
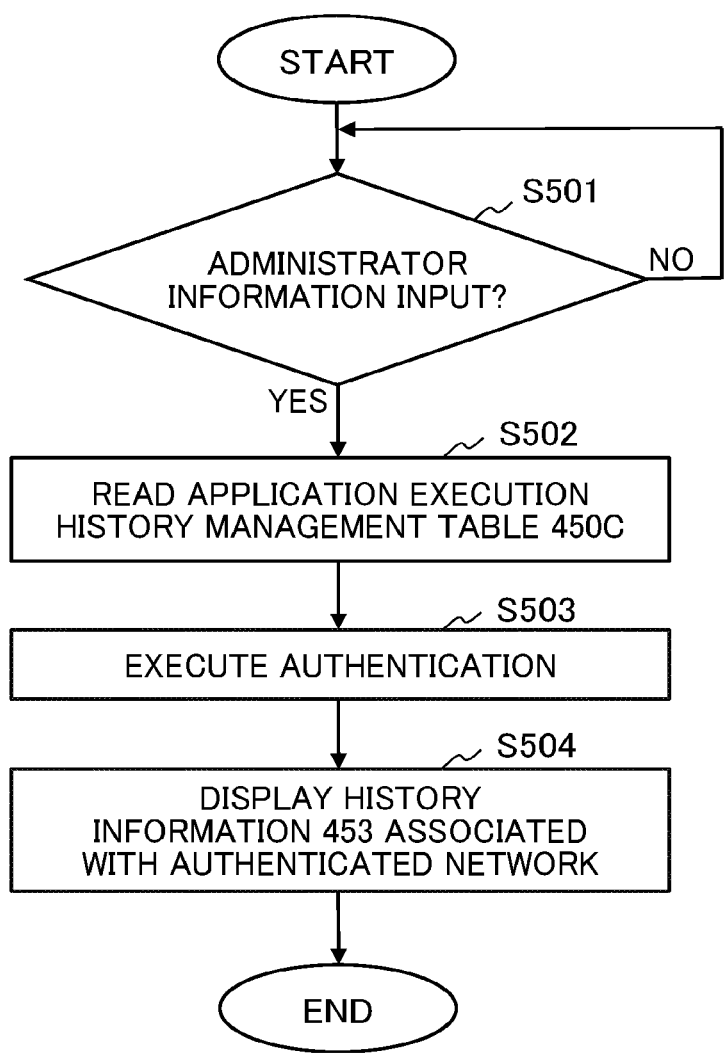
FIG. 16 is a sequence diagram illustrating an example of history information providing processing indicating an execution history of the application in an information processing system according to a variation of the second embodiment of the present disclosure.

FIG. 16 is a sequence diagram illustrating an example of the history information providing process indicating an execution history of an application in the information processing system according to the variation of the second embodiment of the present disclosure. As illustrated in FIG. 13, the information processing apparatus 10B stores the application execution history management table 450C in the storage unit 100.

In step S501, the reception unit 14 of the information processing apparatus 10B uses the control panel 108 illustrated in FIG. 2 to accept input of administrator information. The administrator information is identification information for identifying the administrator of the information processing system 1B, for example, an administrator ID or a password.

In step S502, the storage/readout unit 17 of the information processing apparatus 10B reads the application execution history management table 450C stored in the storage unit 100. Specifically, the storage/readout unit 17 outputs a read request of the application execution history management table 450C to the storage unit 100. In response to the read request, the storage unit 100 outputs the application execution history management table 450C to the storage/readout unit 17.

In step S503, the authentication unit 18 of the information processing apparatus 10B uses the administrator information accepted by the reception unit 14 and the authentication information 459 included in the application execution history management table 450 to execute authentication of the administrator terminal 70.

In step S504, the display control unit 16 of the information processing apparatus 10B causes the control panel 108 to display the history information 453 indicating the execution history of the application associated with the network authenticated by the authentication unit 18. Thereby, the information processing apparatus 10B can ascertain the execution history of the application in the network to be managed using the control panel 108. Note that the display control unit 16 may cause the control panel 108 to display the execution history monitoring setting 455 on the authenticated network together with the history information 453. In this case, the information processing apparatus 10B can set or change the execution history monitoring setting 455 of the network with the administrative authority by using the control panel 108.

As described above, in the information processing apparatus 10B according to the variation of the second embodiment, by performing the authentication of the administrator or the administrator terminal 70 using the control panel 108, setting, changing, or the like of the setting for the network to be managed can be performed using the information processing apparatus 10B, unlike the second embodiment.

Third Embodiment

Figure 17:
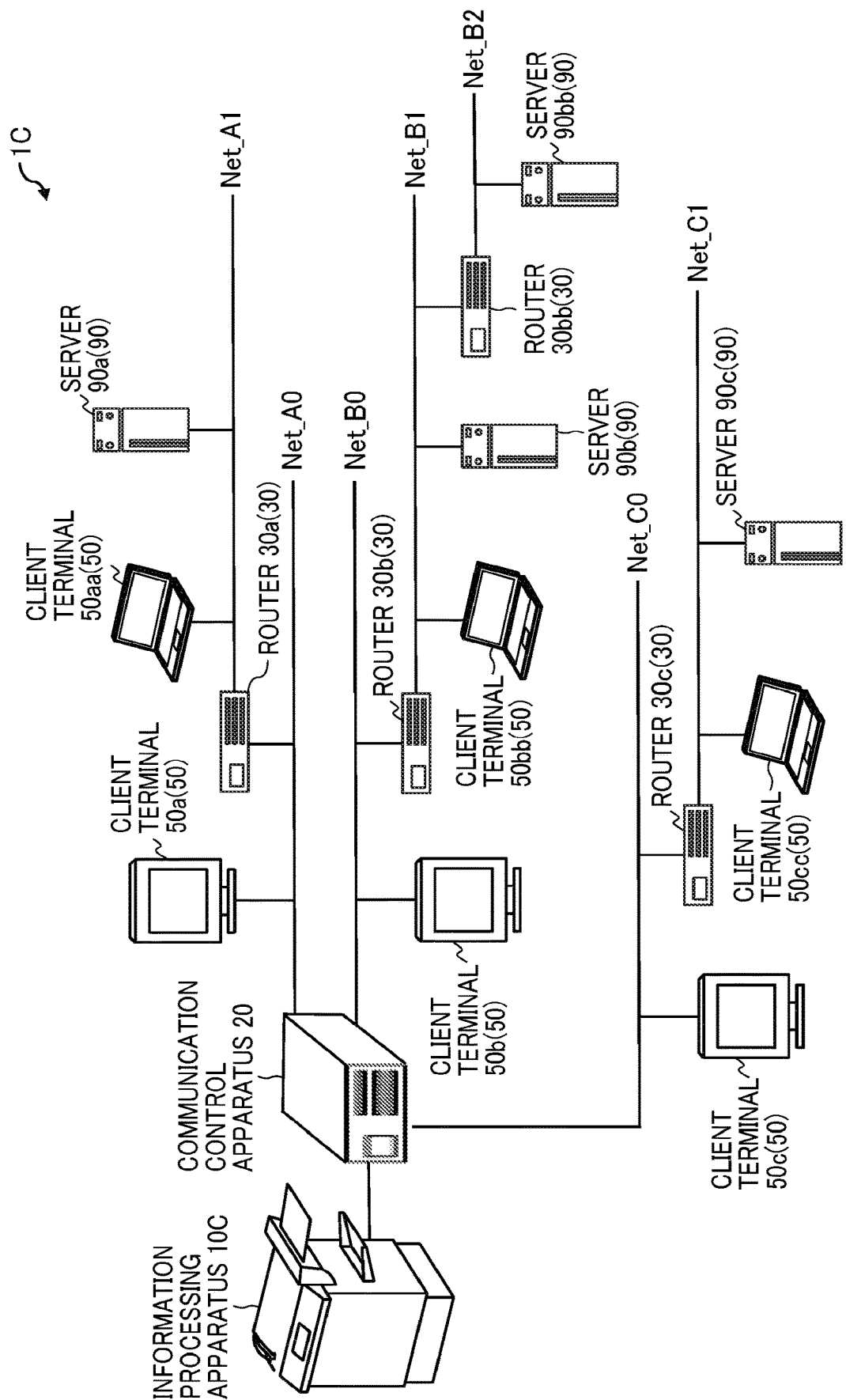
FIG. 17 is a diagram illustrating an example of a system configuration of an information processing system according to a third embodiment of the present disclosure.

Hereinafter, an information processing system according to a third embodiment is described. FIG. 17 is a diagram illustrating an example of a system configuration of an information processing system according to the third embodiment of the present disclosure. In the information processing system 1C illustrated in FIG. 17, the functions of the control unit 1000 of the information processing apparatus 10A or the information processing apparatus 10B are implemented by a communication control apparatus 20 provided separately from the information processing apparatus 10C.

The information processing apparatus 10C includes a network interface for communicating with the communication control apparatus 20. In addition to the function of the control unit 1000 as illustrated in FIG. 4, the communication control apparatus 20 includes a dedicated transmission/reception unit for exchanging data (packet information) with the information processing apparatus 10C. The communication control apparatus 20 controls the communication path between the information processing apparatus 10C and the client terminal 50 or the server 90 by the communication control unit 12 included in the control unit 1000. The communication control unit 12 of the communication control apparatus 20 controls the transfer of data (packet information) by using a method such as bridge control, network address port translation (NAPT) conversion, network address translation (NAT) conversion, and the like. In this case, the network management table 400 stores transfer rules of data (packet information) in advance.

Summary of Embodiments

As described above, the information processing apparatus according to the embodiments of the present disclosure is an information processing apparatus 10A connected to a plurality of networks having different segments and receives an execution request of an application installed in the information processing apparatus 10A from the client terminal 50 (an example of the communication apparatus) connected to a specific network among the plurality of networks. Then, the information processing apparatus 10A determines whether the application corresponding to the execution request received through the specific network is an application that requires recording of the execution history (an example of a predetermined condition), and when it is determined that the application requires recording of the execution history, the history information 453 indicating the execution history of the application associated with the specific network to which the execution request was transmitted is updated. Therefore, the information processing apparatus 10A can manage the application for each network in a plurality of networks to which the information processing apparatus 10A is connected.

The information processing apparatus according to the embodiments of the present disclosure stores the execution history monitoring setting 455 (an example of setting information) set for each network, based on the execution history monitoring setting 455 associated with the network (an example of a specific network) to which the execution request has been transmitted, and determines whether the application corresponding to the execution request received through the specific network is an application that requires recording of the execution history (an example of a predetermined condition). Therefore, the information processing apparatus 10A can manage the application for each organization body and each application, even if each network belongs to a different organization.

Furthermore, the information processing apparatus according to the embodiments of the present disclosure stores execution history monitoring setting 455 (an example of setting information) and history information 453 in association with information for identifying a plurality of networks, and when it is determined that the application corresponding to the execution request requires recording of the execution history, the history information 453 associated with the specific network to which the execution request is transmitted is updated. Therefore, the information processing apparatus 10A can manage the execution history of the application for each organization and for each application, even if each network belongs to a different organization.

The information processing apparatus according to the embodiments of the present disclosure stores the history information 453 in association with the information for identifying the client terminal 50 (an example of a communication apparatus), and when it is determined that the application corresponding to the execution request requires recording of the execution history, updates the history information 453 associated with the client terminal 50 that transmitted the execution request in the network (an example of a specific network) to which the execution request is transmitted. Therefore, in the plurality of networks to which the information processing apparatus 10A is connected, the information processing apparatus 10A can manage the execution history of the application for each of the plurality of client terminals 50 connected to the same network Furthermore, the information processing apparatus according to an embodiment of the present disclosure receives administrator information for identifying the administrator terminal 70 from the administrator terminal 70 that manages the execution history of the application and executes authentication of the administrator terminal 70 based on the administrator information for identifying the administrator terminal 70 received from the administrator terminal 70. Then, the information processing apparatus 10B transmits the history information 453 to the authenticated administrator terminal 70. Therefore, even if the respective networks belong to different organizations, the information processing apparatus 10B enables the administrator of each network to appropriately set and manage the network to be managed using the administrator terminal 70.

The information processing apparatus according to the embodiment of the present disclosure stores authentication information of the administrator terminal in association with information for identifying the plurality of networks and executes authentication of the administrator terminal 70 using administrator information for identifying the administrator terminal 70 and the authentication information. Then, the information processing apparatus 10C transmits the history information 453 associated with the network to which the administrator terminal 70 is authenticated, to the administrator terminal 70. Since the information processing apparatus 10C performs authentication using authentication information set for each network, viewing of the execution history of the application, setting or changing of the execution history monitoring setting 455, and the like from being performed by a third party or an administrator of a different network can be prevented.

The information processing system according to the embodiments of the present disclosure, is an information processing apparatus 10A, 10B, or 10C connected to a plurality of networks having different segments and a client terminal 50 (an example of a communication apparatus) connected to a specific network among a plurality of networks and receives an execution request of an application installed in the information processing apparatus 10A, 10B, or 10C. Then, the information processing system 1A, 1B, or 1C determines whether the application corresponding to the execution request received through the specific network is an application that requires recording of the execution history (an example of a predetermined condition) and when it is determined that the application is an application that requires recording of the execution history, updates the history information 453 indicating the execution history of the application associated with the specific network to which the execution request was transmitted. Therefore, the information processing system 1A, 1B, or 1C can manage the application for each network in a plurality of networks to which the information processing apparatus 10A, 10B, or 10C is connected.

According to the embodiments of the present disclosure, a control method executed by the information processing apparatus (10A) connected to the plurality of networks having different segments includes a receiving step of receiving an execution request of an application installed in the information processing apparatus 10A from a client terminal 50 (an example of a communication apparatus) connected to a specific network among the plurality of networks, a determination step of determining whether the application corresponding to the execution request received through the specific network is an application that requires recording of an execution history (an example of a predetermined condition), and an updating step of updating history information 453 indicating an execution history of an application associated with the specific network to which the execution request has been transmitted when it is determined that the application is an application for recording the execution history. Therefore, the control method according to the embodiments of the present disclosure can manage applications on a network-by-network basis in the plurality of networks connected to the information processing apparatus 10A.

Supplementary Information on Embodiments

The functions of the embodiments can be implemented by a computer executable program described in a legacy programming language such as an assembler, C, C ++, C #, Java (registered trademark), an object-oriented programming language, or the like, and the program for executing the functions of the embodiments can be distributed through an electric communication line.

The programs for executing the functions of the embodiments may be stored and distributed on equipment readable recording media such as a ROM, an electrically erasable programmable read-only memory (EEPROM), an erasable programmable read-only memory (EPROM), a flash memory, a flexible disc, a compact disc-read only memory (CD-ROM), a compact disc-rewritable (CD-RW), a digital versatile disc-read only memory (DVD-ROM), a digital versatile disc-random access memory (DVD-RAM), a digital versatile disc-rewritable (DVD-RW), a Blu-ray disc, a secure digital (SD) card, a magneto-optical (MO) disc, and the like.

In addition, some or all of the functions of the embodiments may be mounted on a programmable device (PD) such as a field programmable gate array (FPGA) or implemented as an application specific integrated circuit (ASIC), and distributed by the recording medium as a circuit configuration data (bit stream data) downloaded to the PD in order to implement the functions of the embodiments on the PD, or as data described by Hardware Description Language (HDL), Very High Speed Integrated Circuits Hardware Description Language (VHDL), Verilog-HDL, etc. for generating circuit configuration data.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus connected to a plurality of networks having different segments, the information processing apparatus comprising:
    processing circuitry configured to
        store setting information for each of the plurality of networks;
        receive an execution request requesting that the information processing apparatus execute a particular application identified in the execution request and installed in the information processing apparatus, from a communication apparatus connected to a specific network among the plurality of networks;
        determine, based on the stored setting information for the specific network, whether the particular application identified in the execution request received through the specific network satisfies a predetermined condition, wherein the predetermined condition is a condition indicating whether an execution history of the particular application is to be recorded; and
        after the particular application is executed, update history information indicating the execution history of the particular application, when it is determined that the predetermined condition is satisfied.

2. The information processing apparatus of claim 1, wherein the processing circuitry is further configured to:
    determine whether the particular application corresponding to the execution request received through the specific network satisfies the predetermined condition, based on the setting information stored for each of the plurality of networks.

3. The information processing apparatus of claim 2, wherein
    the processing circuitry is further configured to determine whether the particular application corresponding to the execution request satisfies the predetermined condition based on information indicating whether or not to record the execution history included in the setting information stored for each of the plurality of networks.

4. The information processing apparatus of claim 1, wherein the processing circuitry is further configured to:
    store each of the setting information and the history information in association with information identifying the plurality of networks; and
    update the history information associated with the specific network, when it is determined that the particular application satisfies the predetermined condition in the specific network.

5. The information processing apparatus of claim 1, wherein the processing circuitry is further configured to:
    store the history information in association with information identifying the communication apparatus; and
    update the history information associated with the communication apparatus that has transmitted the execution request, when it is determined that the particular application satisfies the predetermined condition in the specific network.

6. The information processing apparatus of claim 1, wherein the processing circuitry is further configured to:
    receive administrator information identifying an administrator terminal from the administrator terminal, which manages the execution history of the particular application;
    authenticate the administrator terminal using the administrator information; and
    transmit the history information to the authenticated administrator terminal.

7. The information processing apparatus of claim 6, wherein the processing circuitry is further configured to:
    store authentication information of the administrator terminal in association with the information identifying the plurality of networks;
    authenticate the administrator terminal using the administrator information and the authentication information; and
    transmit the history information associated with the network to which the administrator terminal is authenticated to the administrator terminal.

8. The information processing apparatus of claim 1, wherein the processing circuitry is further configured to not update the history information for the particular application, when it is determined that the predetermined condition is not satisfied.

9. An information processing system, comprising:
    an information processing apparatus connected to a plurality of networks having different segments; and
    a communication apparatus connected to a specific network among the plurality of networks, the information processing apparatus including processing circuitry configured to
        store setting information for each of the plurality of networks;
        receive an execution request requesting that the information processing apparatus execute a particular application identified in the execution request and installed in the information processing apparatus, from a communication apparatus connected to a specific network among the plurality of networks;
        determine, based on the stored setting information for the specific network, whether the particular application identified in the execution request received through the specific network satisfies a predetermined condition, wherein the predetermined condition is a condition indicating whether an execution history of the particular application is to be recorded; and after the particular application is executed, update history information indicating the execution history of the particular application, when it is determined that the predetermined condition is satisfied.

10. The information processing system of claim 9, further comprising:
an administrator terminal managing the execution history of the particular application,
wherein the processing circuitry of the information processing apparatus is further configured to
receive administrator information identifying an administrator terminal from the administrator terminal managing the execution history of the particular application;
authenticate the administrator terminal using the administrator information; and
transmit the history information to the authenticated administrator terminal.

11. A control method performed by an information processing apparatus connected to a plurality of networks having different segments, the method comprising:
storing setting information for each of the plurality of networks;
receiving an execution request requesting that the information processing apparatus execute a particular application identified in the execution request and installed in the information processing apparatus, from a communication apparatus connected to a specific network among the plurality of networks;
determining, based on the stored setting information for the specific network, whether the particular application identified in the execution request received through the specific network satisfies a predetermined condition, wherein the predetermined condition is a condition indicating whether an execution history of the particular application is to be recorded; and
after the particular application is executed, updating history information indicating the execution history of the particular application, when the determining step determines that the predetermined condition is satisfied.

* * * * *